United States Patent
Ito et al.

(10) Patent No.: US 12,080,858 B2
(45) Date of Patent: Sep. 3, 2024

(54) STRUCTURE FOR BATTERY ANALYSIS AND X-RAY DIFFRACTION DEVICE

(71) Applicant: RIGAKU CORPORATION, Akishima (JP)

(72) Inventors: Koichiro Ito, Tokyo (JP); Suguru Sasaki, Tokyo (JP)

(73) Assignee: RIGAKU CORPORATION, Akishima (JP)

( * ) Notice: Subject to any disclaimer, the term of this patent is extended or adjusted under 35 U.S.C. 154(b) by 284 days.

(21) Appl. No.: 17/637,982

(22) PCT Filed: Mar. 30, 2020

(86) PCT No.: PCT/JP2020/014523
§ 371 (c)(1),
(2) Date: Feb. 24, 2022

(87) PCT Pub. No.: WO2021/038943
PCT Pub. Date: Mar. 4, 2021

(65) Prior Publication Data
US 2022/0278381 A1 Sep. 1, 2022

(30) Foreign Application Priority Data
Aug. 27, 2019 (JP) .................. 2019-154312

(51) Int. Cl.
*G01N 23/207* (2018.01)
*G01N 23/20041* (2018.01)
*H01M 10/42* (2006.01)
*H01M 10/0525* (2010.01)

(52) U.S. Cl.
CPC .. *H01M 10/4285* (2013.01); *G01N 23/20041* (2013.01); *G01N 23/207* (2013.01); *H01M 10/0525* (2013.01)

(58) Field of Classification Search
None
See application file for complete search history.

(56) References Cited

U.S. PATENT DOCUMENTS

2002/0192121 A1  12/2002  Gural et al.
2014/0093052 A1   4/2014  Chupas et al.

FOREIGN PATENT DOCUMENTS

CN    209656593 U  * 11/2019
JP    H10-54809 A     2/1998
JP    2010-286323 A  12/2010
(Continued)

OTHER PUBLICATIONS

Office Action dated Jul. 28, 2023, issued in Counterpart JP Application No. 2021-541990, with English Translation. (9 pages).
(Continued)

Primary Examiner — Marcus H Taningco
(74) Attorney, Agent, or Firm — WHDA, LLP

(57) ABSTRACT

A structure for battery analysis of the present invention includes a pressurizing unit (30) having a pressurizing mechanism, and a pressure receiving unit (10) for receiving pressure acting on a sample battery (S), and pressurizes the sample battery (S) accommodated in a hollow portion of a battery accommodation unit (20) between the pressurizing unit (30) and the pressure receiving unit (10) to suppress expansion and contraction of the sample battery (S).

18 Claims, 18 Drawing Sheets

(56) References Cited

FOREIGN PATENT DOCUMENTS

| | | | |
|---|---|---|---|
| JP | 2012-159311 A | | 8/2012 |
| JP | 2015-232546 A | | 12/2015 |
| JP | 2017072530 A | * | 4/2017 |
| JP | 2018-49002 A | | 3/2018 |
| KR | 200462183 Y1 | * | 8/2012 |
| KR | 101274730 B1 | * | 6/2013 |
| KR | 20150009237 A | * | 1/2015 |

OTHER PUBLICATIONS

International Search Report dated Jul. 7, 2020, issued in counterpart International Application No. PCT/JP2020/014523. (2 pages).
Extended (Supplementary) European Search Report dated Aug. 31, 2023, issued in counterpart EP application No. 20858381.5. (7 pages).

* cited by examiner

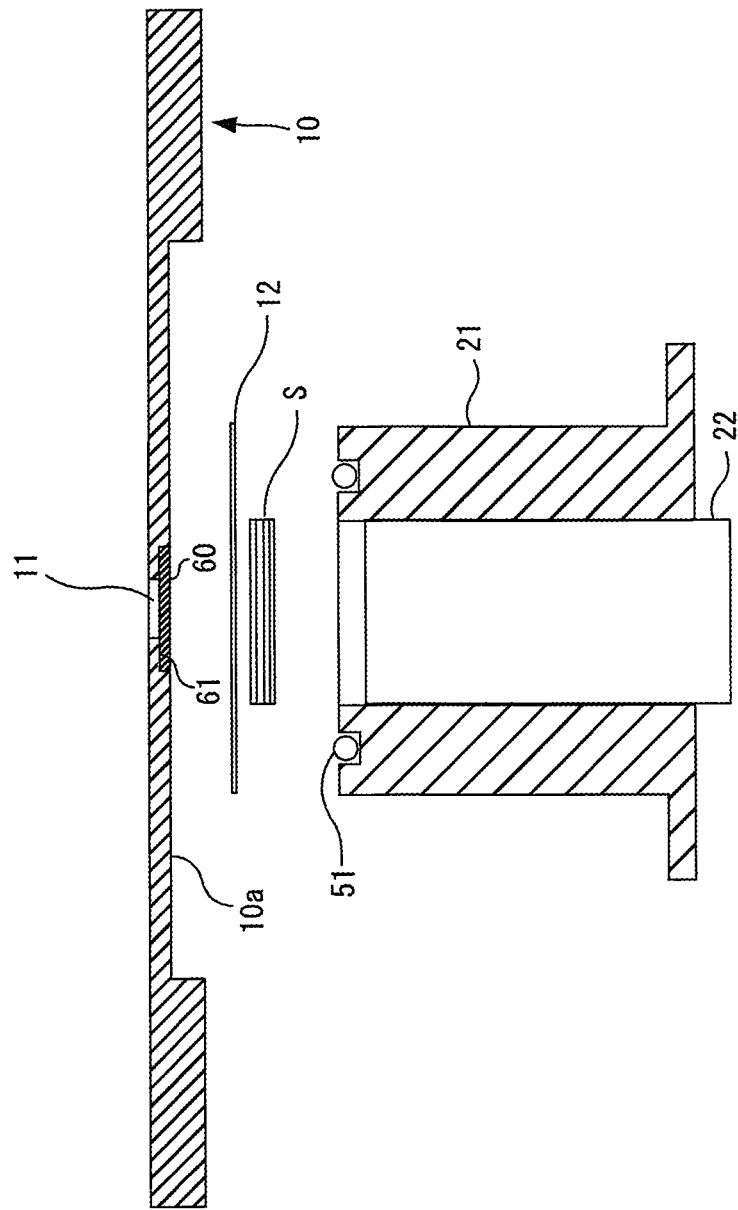

STRUCTURE FOR BATTERY ANALYSIS AND X-RAY DIFFRACTION DEVICE

TECHNICAL FIELD

The present invention relates to a structure for battery analysis to be used when an all-solid-state battery is evaluated by X-ray diffraction measurement, and an X-ray diffraction device in which the structure for battery analysis is mounted.

BACKGROUND ART

An all-solid-state battery is configured to have electrode active material layers on both end sides of an electrolyte layer, which causes capacity deterioration and resistance increase during a charging and discharging cycle. For example, in an all-solid-state lithium-ion battery, the crystal structure is likely to change with insertion and removal of lithium ions (Li). Therefore, in order to elucidate the deterioration mechanism, changes in the crystal structure due to charging and discharging are evaluated by X-ray diffraction measurement. Patent Literatures 1 and 2 disclose conventional structures for battery analysis used for evaluation of sample batteries by X-ray diffraction measurement.

A battery structure for X-ray measurement disclosed in Patent Literature 1 is configured so that a battery element (2) is pinched by a negative electrode side cover (5a) and a positive electrode side cover (5b), and these covers (5a, 5b) are tightened by using many nuts (22) to hermetically seal the battery element (2), thereby shielding from the atmosphere. Here, the tightening structure using the nuts (22) is used to ensure the airtightness of the battery element (2) (see paragraph "0020" in the specification of Patent Literature 1).

Further, an analysis cell disclosed in Patent Literature 2 is configured to include a housing (10) having a first member (11), a second member (21), and a third member (31), and accommodate a sample battery (100) in the housing (10) to perform evaluation by X-ray diffraction measurement. The respective members (11, 21, 31) constituting the housing (10) are assembled by inserting bolts into a large number of through-holes (12, 22, 32) formed in the respective members and tightening the bolts with nuts (see paragraph "0053" in the specification of Patent Literature 2).

Here, reference signs in parentheses are those assigned to the respective components in each Patent Literature (hereinafter, the same applies).

A solid electrolyte is used for an electrolyte layer in an all-solid-state battery. Inside the all-solid-state battery, an electrode active material layer, a solid electrolyte layer, a conductive material, etc. which serve as respective components expand and contract due to charging and discharging, and phenomena such as voids between particles, exfoliation of the interface between the solid electrolyte layer and the electrode active material layer or internal cracks are likely to occur, and if these phenomena occur, the battery would not function normally. Therefore, when analysis and evaluation are performed on this type of all-solid-state battery as a sample battery, the sample battery is required to be held in a pressurized state to secure a conductive path and suppress expansion and contraction caused by charging and discharging.

However, all of the conventional structures for battery analysis (analysis cells) disclosed in Patent Literatures 1 and 2 described above do not have any configuration for holding sample batteries in a pressurized state to secure a conductive path and suppress the expansion and contraction of the sample batteries caused by charging and discharging.

Incidentally, the tightening structure using the nuts (22) disclosed in Patent Literature 1 is used to ensure the airtightness of the battery element (2), and also elastic members (4a, 4b) are interposed, so that it is impossible to apply a large pressure to the sample battery to the extent that the conductive path can be secured and the expansion and contraction can be suppressed even when the nuts (22) are tightened.

Further, Patent Literature 2 discloses a pressurizing mechanism (46) including a pushing rod, and the pressurizing mechanism (46) is used to protrude, from a window portion (13) of the housing (10), an electrode active material (112), a sample electrode (110) and a part of a window member (51) which are components of a sample battery (see paragraph "0042" in the specification and FIG. 3 of Patent Literature 2).

By protruding the electrode active material (112), the sample electrode (110), and the part of the window member (51) from the window portion (13) of the housing (10) as described above, the peripheries of the electrode active material (112) and the sample electrode (110) are covered by the window member (51) to prevent an electrolytic solution from infiltrating in between the sample electrode (110) and the window member (51) and improve the airtightness of the sample battery (see paragraph "0054" in the specification of Patent Literature 2).

However, the pressurizing mechanism (46) of Patent Literature 2 is configured so that a member for receiving the pressing force of the pushing rod is not arranged on a side facing the pushing rod, and thus the window member (51) receives the pressing force while being stretched. Therefore, it is impossible for even the pressurizing mechanism (46) to apply a large pressure to the sample battery to the extent that the conductive path can be secured and the expansion and contraction can be suppressed.

Since respective components constituting the all-solid-state battery are material that react with moisture or air, a work of assembling a structure for battery analysis (analysis cell) while accommodating a battery is required to be performed under an environment that the respective components of the sample battery do not come into contact with moisture and air. For example, when an all-solid-state lithium-ion battery is used as a sample battery, the work of assembling the structure for battery analysis is performed in a glove box having an internal space which is kept in a high-purity argon gas atmosphere. A worker carries out the assembling work of the structure by his or her operation from the outside through gloves.

However, all of the prior arts disclosed in the above-mentioned Patent Literatures have a drawback that the assembling work in the glove box becomes complicated because the prior arts need a work of tightening a lot of nuts at the time of assembling.

CITATION LIST

Patent Literature

Patent Literature 1: Japanese Patent Laid-Open No. 2012-159311

Patent Literature 2: Japanese Patent Laid-Open No. 2017-72530

DISCLOSURE OF INVENTION

Problem to be Solved by the Invention

The present invention has been made in view of the above circumstances, and has a first object to provide a structure for battery analysis capable of suppressing expansion and contraction of a sample battery by pressurizing the sample battery.

Further, the present invention has a second object to provide a structure for battery analysis capable of accommodating therein and hermetically sealing a sample battery by a simple assembling work, and realizing analysis and evaluation of the sample battery by using X-ray diffraction measurement in the atmosphere.

Still further, the present invention has a third object to provide an X-ray diffraction device capable of measuring a sample battery with high accuracy by using the structure for battery analysis.

Means for Solving the Problem

A structure for battery analysis according to the present invention comprises: a battery accommodation unit in which a hollow portion for accommodating a sample battery therein is formed; a pressurizing unit that is mounted on one end surface side of the battery accommodation unit and includes a pressurizing mechanism for applying pressure to the sample battery accommodated in the hollow portion of the battery accommodation unit; and a pressure receiving unit that is fixed to the other end surface side of the battery accommodation unit and receives pressure acting on the sample battery.

In the pressure receiving unit, an X-ray window for irradiating the sample battery accommodated in the hollow portion of the battery accommodation unit with X-rays and emitting diffracted X-rays reflected from the sample battery to an outside is formed by a cutout hole penetrating from a front surface to a back surface. A partition member for transmitting X-rays therethrough and shielding the hollow portion in the battery accommodation unit from an atmosphere is arranged in the X-ray window.

According to the present invention the configuration as described above, the sample battery accommodated in the hollow portion of the battery accommodation unit is pressurized between the pressurizing unit and the pressure receiving unit to secure a conductive path therefor and suppress expansion and contraction.

The pressure receiving unit and the battery accommodation unit may be formed integrally with each other to be configured as a single unit.

It is preferable that the X-ray window is formed to have a smaller width than a press region where the sample battery accommodated in the hollow portion of the battery accommodation unit is in contact with the partition member.

The X-ray window is formed to have such a width, whereby an area sufficient to receive pressure from the pressurizing unit can be ensured on the back surface of the pressure receiving unit.

The pressurizing mechanism may include a bolt member for adjusting pressure to act on at least the sample battery, and a nut portion to be threaded with the bolt member may be formed in the pressurizing unit. Further, a pressing member may be inserted into the hollow portion of the battery accommodation unit, so that the sample battery receives pressure from the bolt member via the pressing member.

With this configuration, a desired pressure can be applied to the sample battery by a simple operation of screwing one bolt member.

In particular, an all-solid-state battery does not function normally as a battery because a void between particles, exfoliation of an interface between a solid electrolyte layer and an electrode active material layer, or an internal crack is liable to occur due to expansion and contraction caused by repeated charging and discharging. Therefore, it is necessary to apply high pressure at all times in experiments. In order to form this pressurized state, it is preferable that a configuration capable of pressurizing a sample battery by a simple operation is provided in order to smoothly carry out an appropriate evaluation operation.

Further, the present invention may be configured to have an insulating member which is fitted in the hollow portion of the battery accommodation unit to insulate an outer peripheral surface of the sample battery accommodated in the hollow portion and close the X-ray window. A tip surface of the insulating member is pressed against the partition member via an airtight member, whereby the partition member comes into close contact with a periphery of the X-ray window with pressing force to close the X-ray window.

With such a configuration, the insulating member secures insulation for the outer peripheral surface of the sample battery, and also the X-ray window can be made airtight.

Further, the present invention may be configured so that male and female screw portions are provided between one end surface side of the battery accommodation unit and one end surface side of the pressurizing unit to be mounted on the one end surface side of the battery accommodation unit, and the one end surface side of the pressurizing unit is mounted on the one end surface side of the battery accommodation unit by a screwing operation of the screw portions to hermetically seal the units.

This configuration makes it possible to mount the pressurizing unit on the battery accommodating unit and hermetically seal the hollow portion of the battery accommodation unit in which the sample battery is accommodated, by merely performing the screwing operation of the pair of male and female screw portions.

Accordingly, a worker can easily perform an assembling work even when the assembling work is an assembling work from the outside of a glove box via gloves. Note that even when the assembling work is performed in a relatively large space such as a dry room, the work can be still easily performed.

Further, the pressurizing unit may be configured such that the pressurizing mechanism is exposed to the other end surface side where no screw portion is provided, and a pressurizing operation is performed from the other end surface side. In such a configuration, it is preferable that an airtight case unit for airtightly sealing the circumference of the pressurizing mechanism exposed to the other end surface side of the pressurizing unit is provided, and second male and female screw portions are provided between the other end surface side of the pressurizing unit and one end surface side of the airtight case unit to be mounted on the other end surface side of the pressurizing unit to mount the one end surface side of the airtight case unit on the other end surface side of the pressurizing unit by a screwing operation of the second screw portions to hermetically seal them.

With this configuration, a space on the other end surface side of the pressurizing unit where the pressurizing mechanism is exposed can be made airtight by the airtight case unit.

The sample battery is configured, for example, so that electrode active material layers are arranged on both end sides of an electrolyte layer and current collector layers are further arranged outside the electrode active material layers, respectively.

When a sample battery having such a configuration is targeted, it is preferable that a first electrode terminal that is electrically conducted to one of the current collector layers, and a second electrode terminal that is electrically conducted to the other current collector layer are provided outside.

By connecting a charging and discharging device between these electrode terminals, the sample battery can be charged and discharged, and the evaluation of the sample battery in the process of the charging and discharging cycle can be continuously carried out.

Here, the first electrode terminal may be provided outside the pressure receiving unit, the pressure receiving unit may be formed of a metal member having electrical conductivity, and the one current collector layer and the first electrode terminal may be electrically conducted to each other via the pressure receiving unit.

Further, the pressurizing mechanism may be configured by a metal member having electrical conductivity, and the other current collector layer and the second electrode terminal may be electrically conducted to each other via the pressurizing mechanism.

Further, according to the present invention, the partition member may be configured as one of the current collector layers constituting the sample battery, and the pressurizing mechanism may be configured to press the sample battery and the partition member against a back surface of the pressure receiving unit so that the partition member and one of the electrode active material layers constituting the sample battery are in close contact with each other.

This eliminates the need to separately prepare the partition member and reduces the number of parts by one.

Here, when pressure acts on the current collector layer arranged at an opening portion of a back surface of the X-ray window, there is a risk that a part of the current collector layer is pushed into the cutout hole forming the X-ray window, which causes formation of unevenness or wrinkles.

Therefore, it is preferable that the structure for battery analysis further comprises a block holder that is fitted from an opening portion of a front surface of the X-ray window and is arranged so that a tip surface thereof fills the opening portion of the back surface of the X-ray window.

The tip surface of this block holder is filled in the opening portion of the back surface of the X-ray window, whereby it is possible to prevent a part of the current collector layer from being pushed into the X-ray window.

Further, the pressurizing unit may be configured to include an output unit for outputting an electric signal related to a pressure acting on the pressing member. The pressure acting on the pressing member is measured based on the electric signal output from this output unit, whereby the change in volume of the sample battery caused by charging and discharging can be measured with a pressure gauge, and the correlation with the change in crystal structure can be analyzed and evaluated.

Further, the present invention may be configured so that a recess portion is provided around the back surface of the X-ray window formed in the pressure receiving unit, and vitrified carbon (glassy carbon) or beryllium of a thin plate-like shape is placed in the recess portion.

Vitrified carbon called glassy carbon and beryllium have the property of transmitting X-rays therethrough, but blocking the atmosphere. Moreover, they have high resistance to pressure. Therefore, even when they suffer pressure acting on the sample battery, they are not pushed into the cutout hole of the X-ray window, and can support the partition member and the sample battery by a flat surface.

Further, the present invention may be configured to further comprise a positioning contact portion that comes into contact with a positioning portion provided in the X-ray diffraction device to position the X-ray window with respect to X-rays emitted from the X-ray diffraction device.

Here, if the positioning contact portion is provided at each of two places which are symmetrical with respect to a rotation center when rotating freely rotatably with respect to the X-ray diffraction device, X-rays can be incident to the X-ray window from directions which are different by 180 degrees.

Still further, the present invention may be configured to further comprise a base portion having a circular bottom surface and a circumferential surface that is arranged on a mounting stage including a circular groove provided in the X-ray diffraction device and is freely rotatable while guided by the circular groove of the mounting stage.

As described above, the base portion that is freely rotatably supported only by arranging it in the circular groove provided in the X-ray diffraction device is provide, whereby it is possible to facilitate the mounting work onto the X-ray diffraction device.

Next, an X-ray diffraction device according to the present invention is configured so that the structure for battery analysis having the configuration described above is mounted, and the sample battery accommodated in the hollow portion of the battery accommodation unit is irradiated with X-rays through the X-ray window to perform X-ray diffraction measurement.

As a result, high-precision X-ray diffraction measurement can be performed on the sample battery.

The X-ray diffraction device according to the present invention comprises a positioning block including a positioning portion for positioning an X-ray window of a structure for battery analysis, and a slit which is freely attachable and detachable to the positioning block, and reduces scatter X-rays generated from other portions than the sample battery accommodated in the hollow portion of the battery accommodation unit.

It is possible to perform remarkably high-precision X-ray diffraction measurement via this slit.

As described above, according to the present invention, it is possible to implement the analysis and evaluation on the sample battery by X-ray diffraction measurement in a state where the sample battery is held in a pressurized state and the expansion and contraction caused by charging and discharging are suppressed.

BRIEF DESCRIPTION OF THE DRAWINGS

FIG. 18 is a front sectional view showing a modification of the present invention.

DESCRIPTION OF REFERENCE SIGNS

Figure 1:
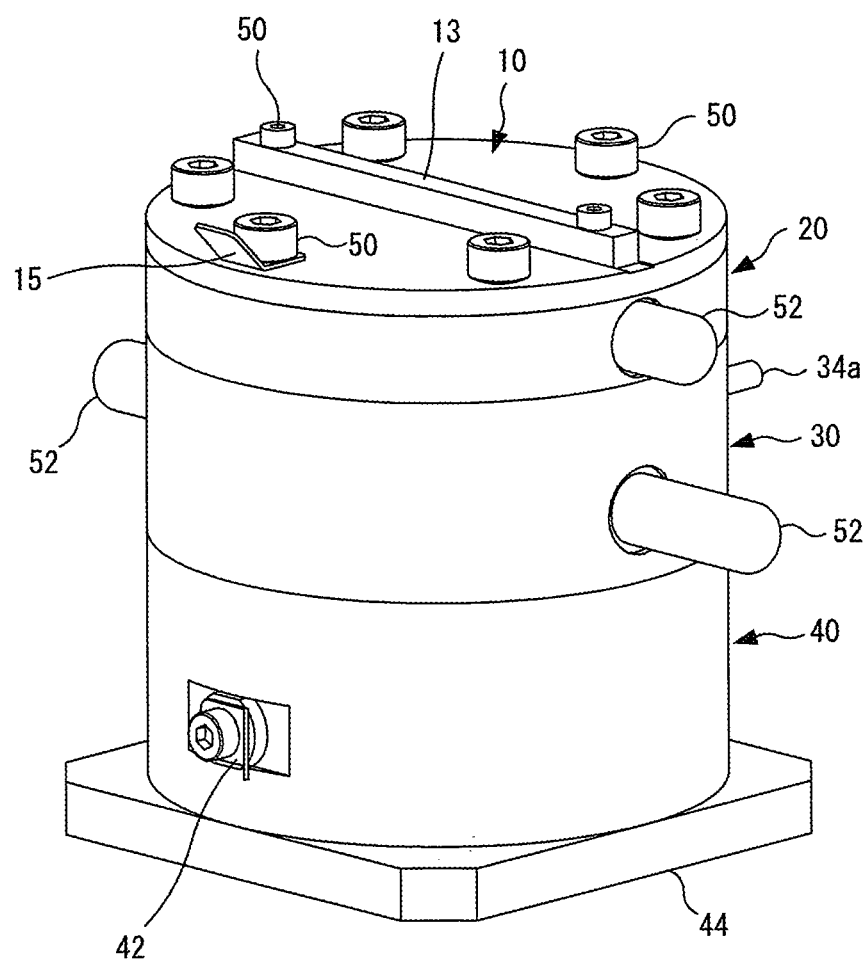
FIG. 1 is a perspective view showing the appearance of a structure for battery analysis according to a first embodiment of the present invention.

S: sample battery, 1: structure for battery analysis,
- 10: pressure receiving unit, 11: X-ray window, 12: partition member (current collector layer), 13: block holder, 14: convex portion, 15: first electrode terminal,
- 20: battery accommodation unit, 21: insulating member, 21*a*: flange portion, 22: pressing member, 23: male screw portion,
- 30: pressurizing unit, 30A: outer body portion, 30B: inner body portion, 31: nut portion, 32: bolt member, 33: pressure transmitting member, 34: load cell, 34*a*: output rod (output unit), 35: female screw portion, 36: metal ring, 37: second male screw portion,
- 40: airtight case unit, 41: second female screw portion, 42: second electrode terminal, 43: conductive member, 44: base, 44*a*: reference end face, 45: elongated hole,
- 50: fastener, 51: O-ring (airtight member), 52: operating rod (positioning contact portion),
- 60: window filling material, 61: recess portion,
- 100: pressure receiving and battery accommodation unit, 101: base portion,
- 200: mounting stage, 201: circumferential groove, 202: positioning block, 202*a*: positioning portion, 203: slit, 210: X-ray source, 220: X-ray detector

BEST MODE FOR CARRYING OUT THE INVENTION

Hereinafter, embodiments of the present invention will be described in detail with reference to the drawings.

A sample battery to be analyzed and evaluated has a configuration that electrode active material layers are arranged on both end sides of an electrolyte layer, and a current collector layer is arranged outside each of the electrode active material layers.

Conventional batteries such as lithium-ion batteries use a liquid or gel-like electrolyte for an electrolyte layer, but all-solid-state batteries which have been developed in recent years use a solid electrolyte for the electrolyte layer. Inside all-solid-state batteries, voids among particles, exfoliation of the interface between a solid electrolyte layer and an electrode active material layer, internal cracks, etc. are likely to occur due to expansion and contraction caused by charging and discharging, and when these phenomena occur, the batteries do not function normally as a battery. Therefore, when analysis and evaluation are performed by using this type of all-solid-state battery as a sample battery, it is necessary to hold the sample battery in a pressurized state to secure a conductive path and suppress expansion and contraction caused by charging and discharging.

Further, as described above, the respective components constituting the all-solid-state battery are materials that react with moisture or air. Therefore, in general, the work of assembling the structure for battery analysis is performed in a space under an atmosphere of a high-purity argon gas as an inert gas in the glove box (GB).

The sample battery accommodated in the structure for battery analysis in a hermetically sealed state is analyzed and evaluated by using an X-ray diffraction device in the atmosphere. Here, it is preferable that the X-ray diffraction device can perform analysis and evaluation by using a highly versatile reflection type X-ray diffraction device.

The structure for battery analysis according to each embodiment of the present invention described below has a configuration that satisfies all of the above-mentioned conditions.

First Embodiment

First, a structure for battery analysis according to a first embodiment of the present invention will be described in detail with reference to FIGS. 1 to 9.

Figure 2:
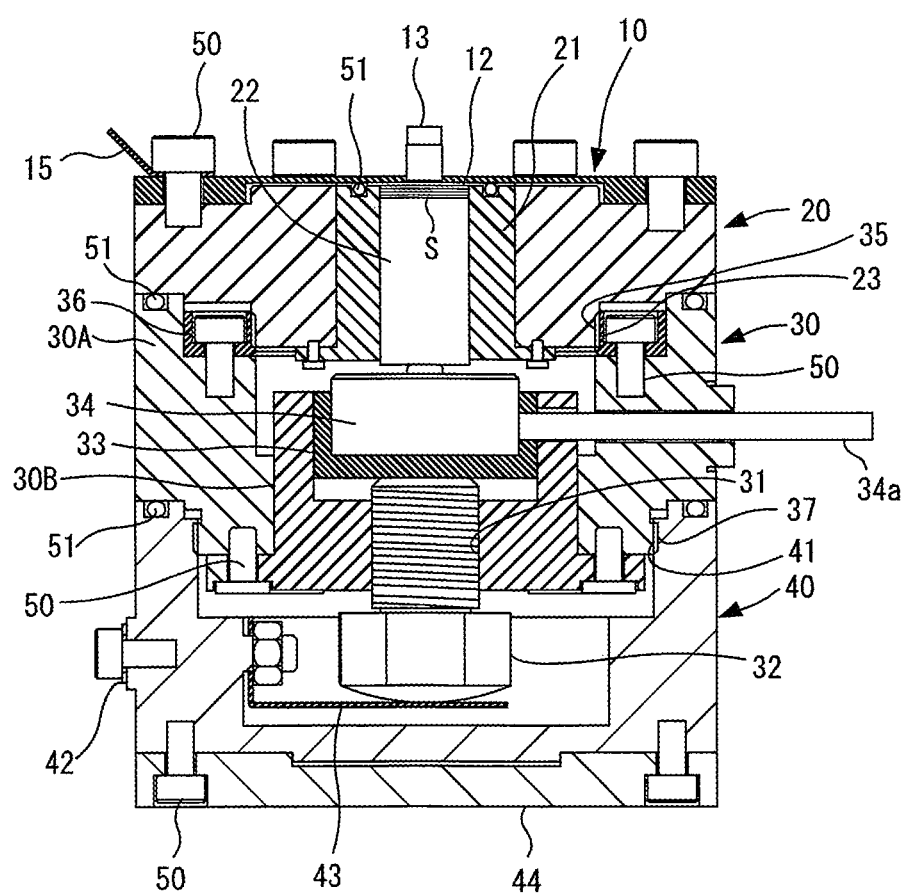
FIG. 2 is a front sectional view showing an entire configuration of the structure for battery analysis according to the first embodiment of the present invention.

FIG. 1 is a perspective view showing the appearance of the structure for battery analysis according to the present embodiment, and FIG. 2 is a front sectional view showing an entire configuration of the structure for battery analysis. Further, FIG. 3 is an exploded perspective view of the structure for battery analysis according to the present embodiment, and FIG. 4 is an exploded front sectional view of the structure for battery analysis according to the present embodiment.

Figure 3:
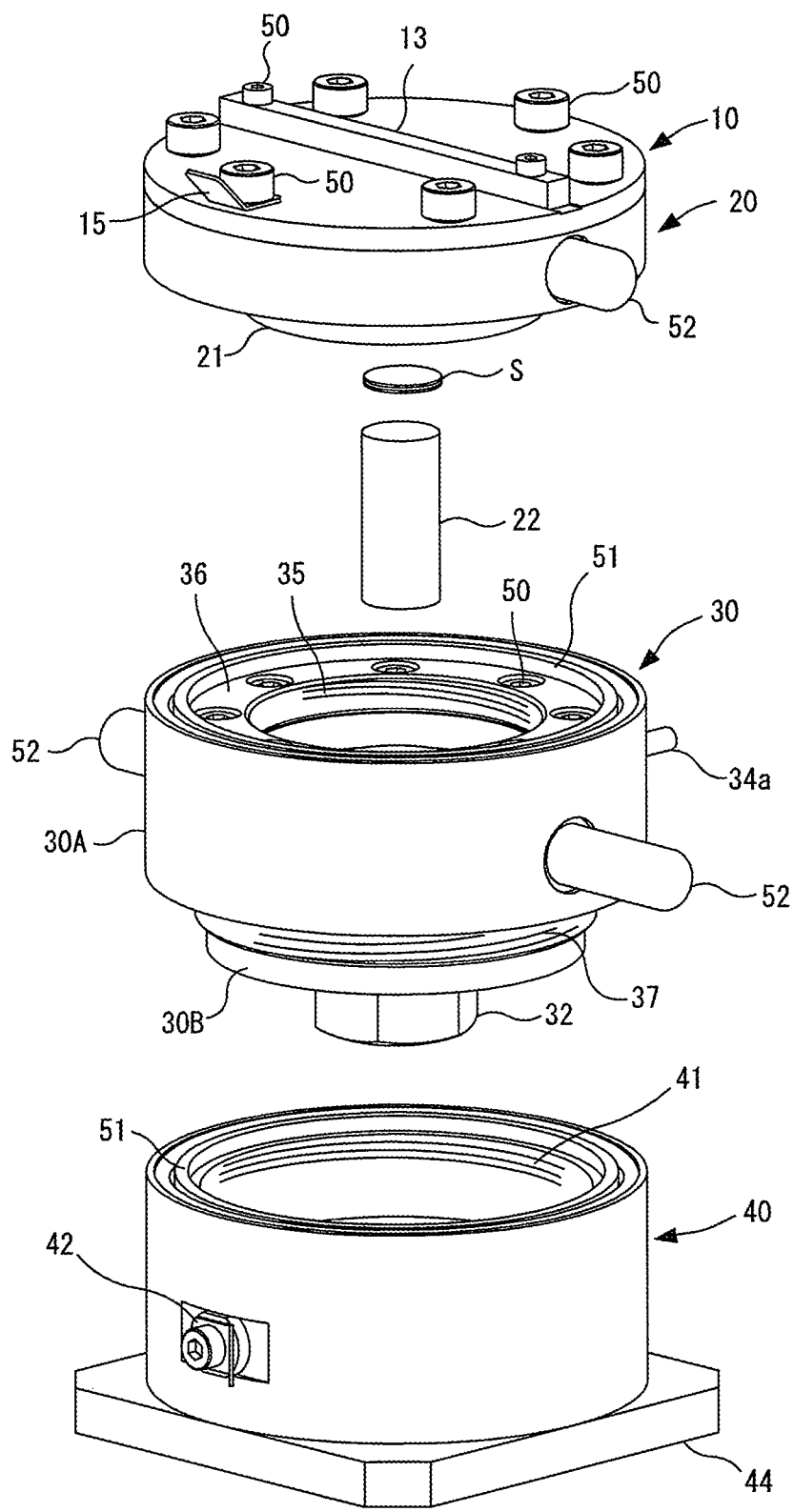
FIG. 3 is an exploded perspective view of the structure for battery analysis according to the first embodiment of the present invention.
Figure 4:
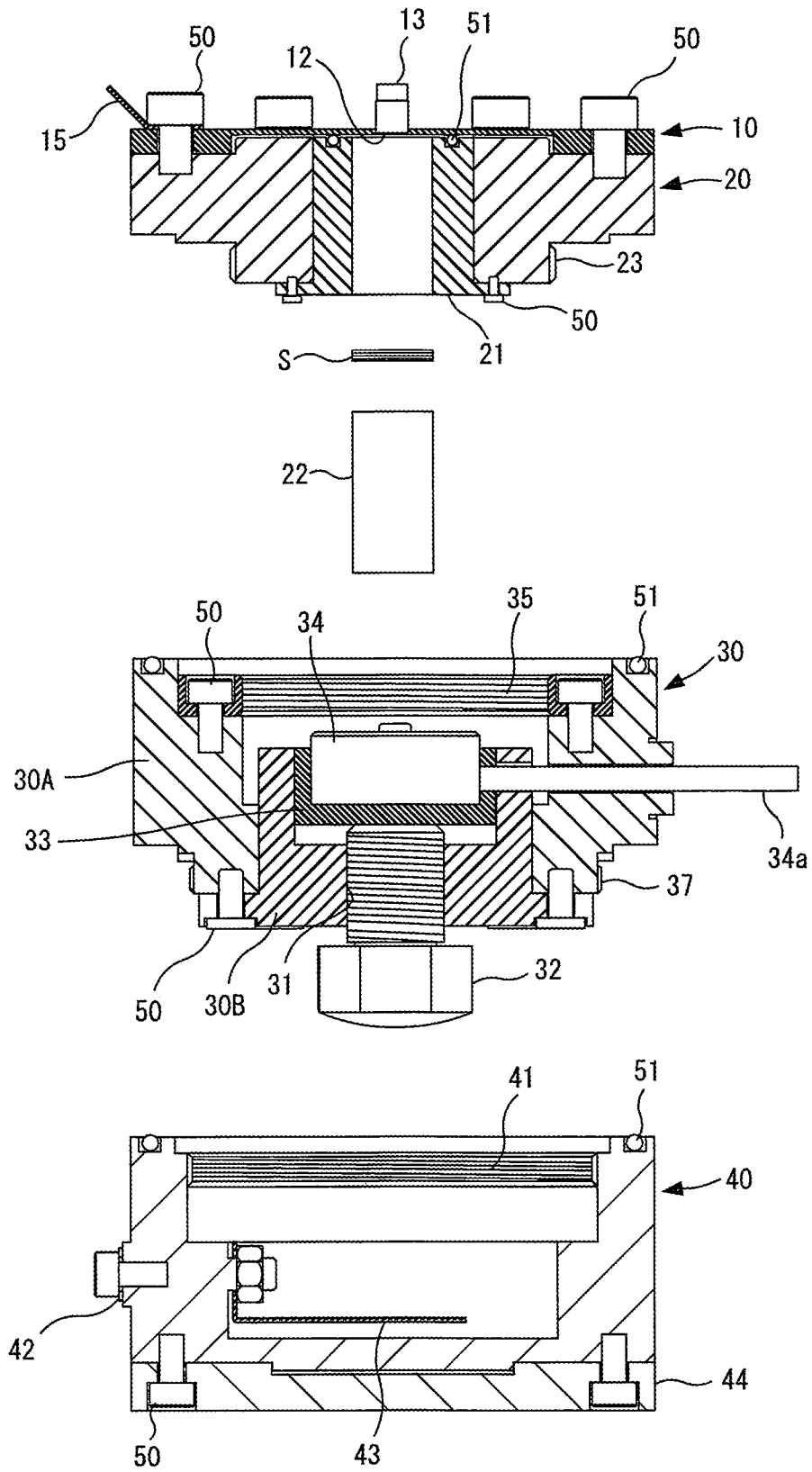
FIG. 4 is an exploded front sectional view of the structure for battery analysis according to the first embodiment of the present invention.

As shown in FIGS. 3 and 4, the structure for battery analysis includes respective units of a pressure receiving unit 10, a battery accommodation unit 20, a pressurizing unit 30, and an airtight case unit 40 as components. The pressurizing unit 30 is mounted on one end surface side (lower end surface side in the figures) of the battery accommodation unit 20, and the pressure receiving unit 10 is mounted on the other end surface side (upper end surface side in the figures) of the battery accommodation unit 20.

A sample battery S as an analysis target is accommodated in the battery accommodation unit 20, and shielded from the atmosphere in a hermetically sealed state.

Figure 5:
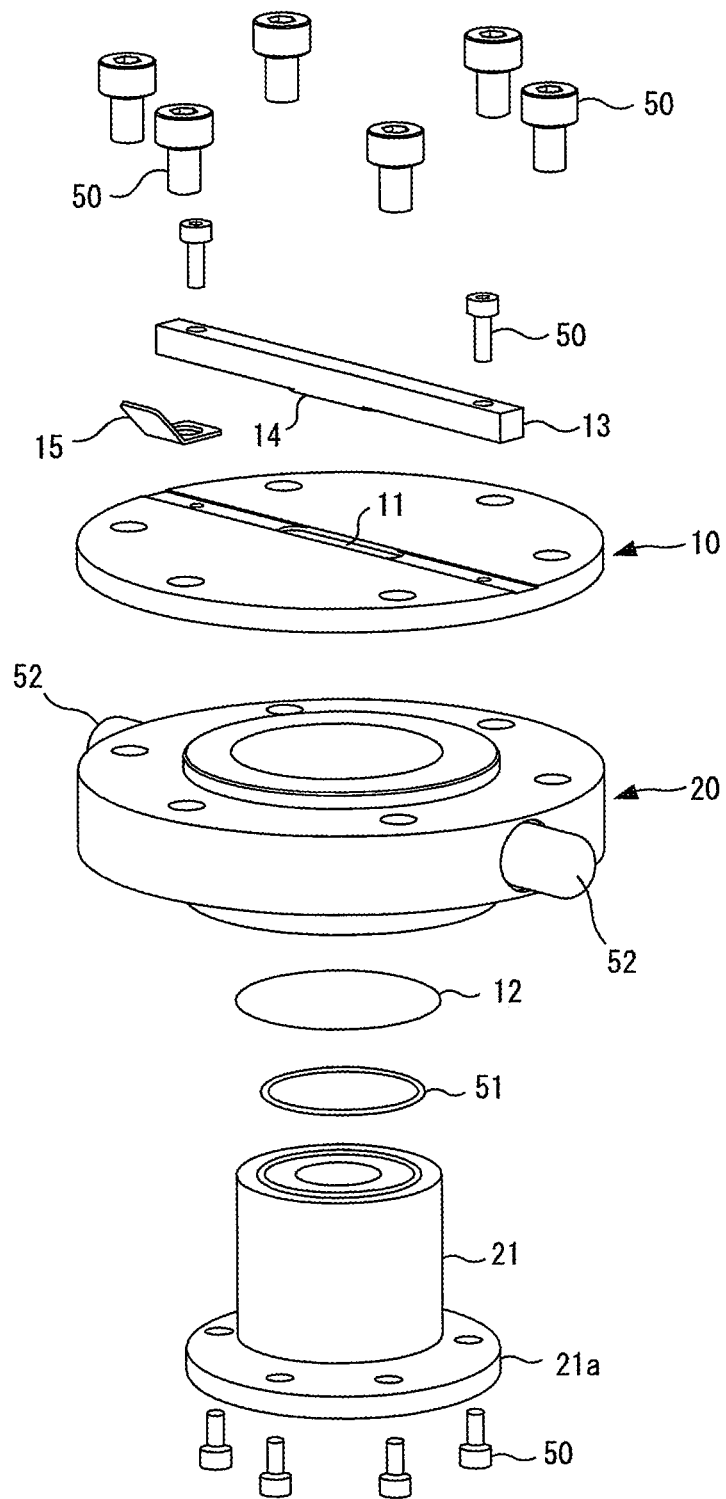
FIG. 5 is an exploded perspective view showing configurations of a pressure receiving unit and a battery accommodation unit.

FIG. 5 is an exploded perspective view showing configurations of the pressure receiving unit and the battery accommodation unit.

As shown in FIGS. 3 to 5, the pressure receiving unit 10 is formed in a disk shape, and an X-ray window 11 which has an elongated hole-like shape, passes through the center thereof and extends in a radial direction is formed by a cutout hole penetrating from the front surface to the back surface (see FIG. 5). The shape of the X-ray window 11 is not limited to the elongated hole-like shape, but may be formed in another shape as needed, such as a circular shape or a rectangular shape.

The pressure receiving unit 10 is crimp and fixed to the battery accommodation unit 20 by fasteners 50 such as bolts.

The battery accommodation unit 20 is formed in a cylindrical shape, and the sample battery S is accommodated in a hollow portion which is formed in the battery accommodation unit 20 and has a circular cross-section. It is preferable that the battery accommodation unit 20 is made of a metal material in order to secure the strength. When the battery accommodation unit 20 is made of a metal material, the sample battery S accommodated in the hollow portion is electrically short-circuited. Therefore, a cylindrical insulating member 21 is fitted into the hollow portion of the battery accommodation unit 20, and the sample battery S is accommodated in the hollow portion of the insulating member 21, whereby the outer peripheral surface of the sample battery S is insulated by the insulating member 21. The insulating member 21 is made of a synthetic resin material having an insulating property.

It is preferable that insulating members 21 having various dimensions are prepared so that the inner diameter of the hollow portion matches the diameter of each of the various sample batteries S as targets to be analyzed and evaluated, and are replaced by one another and used according to the sample battery S to be analyzed and evaluated.

A partition member 12 is arranged on the back surface side of the X-ray window 11 of the pressure receiving unit 10 to shield the hollow portion in the battery accommodation unit 20 from the atmosphere. The partition member 12 is made of a material that allows X-rays to pass therethrough, but does not allow air and moisture to pass therethrough.

In the present embodiment, the partition member 12 is configured by one of current collector layers to be arranged as electrodes on both surfaces of the sample battery S. The current collector layer is formed of a metal foil such as an aluminum foil or copper foil having conductivity. The metal foil has a property which transmits X-rays therethrough, but does not transmit air and moisture. Therefore, the metal foil is applicable as the partition member 12. Accordingly, in the present embodiment, one of the current collector layers of the sample battery S is separated in advance, and this current collector layer is arranged on the back surface of the pressure receiving unit 10 so as to cover the X-ray window 11.

Figure 6A:
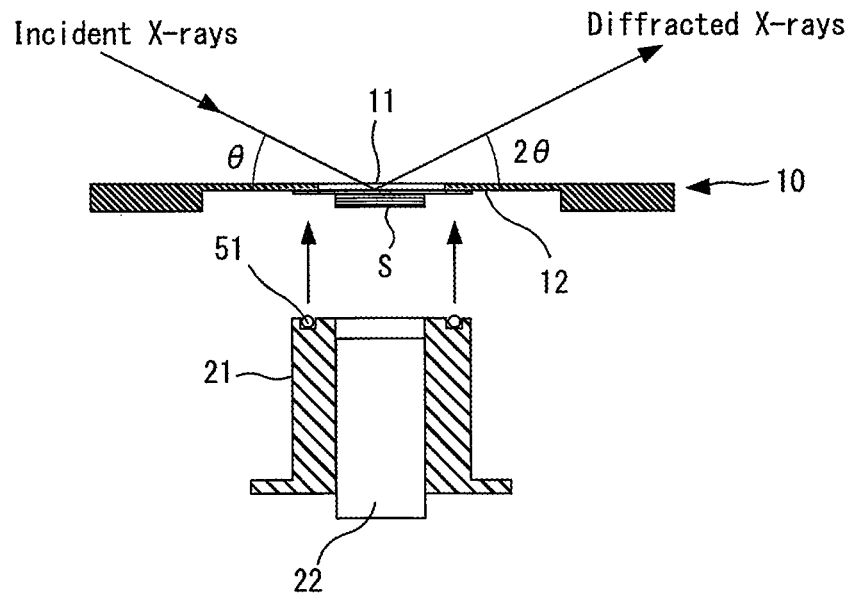
FIG. 6A is a front sectional view showing the arrangement of a current collector layer on the back surface of the pressure receiving unit, and a pressing function by an insulating member.
Figure 6B:
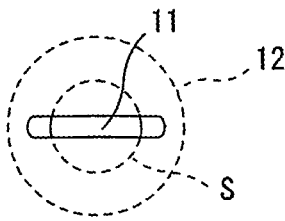
FIG. 6B is a plan view showing the arrangement relation of an X-ray window, the current collector layer, and a sample battery.

Further, in the present embodiment, the insulating member 21 is provided with a function as pressing means for pressing the partition member 12 (current collector layer) against the back surface of the pressure receiving unit 10. In short, as shown in FIG. 6A, the partition member 12 (current collector layer) is arranged on the back surface of the pressure receiving unit 10, and the partition member is pressed against the back surface of the pressure receiving unit 10 by the insulating member 21 to bring them into close contact with each other. As shown in FIG. 6B, the partition member 12 (current collector layer) is arranged so as to cover the X-ray window 11 formed in the pressure receiving unit 10, and the partition member 12 is brought into close contact with the back surface of the pressure receiving unit 10 by the insulating member 21, which makes it possible to prevent the infiltration of the atmosphere from the X-ray window 11 with high accuracy.

When the partition member 12 is not configured by the current collector layer, the partition member 12 may be attached to the back surface of the pressure receiving unit 10 to hermetically seal the X-ray window 11. In that case, it is unnecessary to provide the insulating member 21 with a function as pressing means.

As shown in FIGS. 6A and 6B, the sample battery S is placed in the pressure receiving unit 10 at a position facing the X-ray window 11 via the partition member 12 (current collector layer). The sample battery S is pressed against the back surface of the pressure receiving unit 10 with an arbitrary pressure as described later.

The pressure receiving unit 10 has a function of receiving this pressure acting on the sample battery S.

Further, as shown in FIG. 6A, the X-ray window 11 has a function of irradiating the sample battery S placed on the back surface side of the pressure receiving unit 10 with X-rays, and emitting diffracted X-rays reflected from the sample battery S to the outside.

Here, as shown in FIG. 6B, the width of the X-ray window 11 is set to be smaller than at least the width of the sample battery S in order to secure a sufficient area on the back surface of the pressure receiving unit 10 for receiving the pressure from the sample battery S. Further, as shown in FIG. 6A, it is preferable that the length of the X-ray window 11 and the thickness of the inner wall thereof are determined in consideration of a measurement range of X-ray diffraction measurement (an X-ray incident angle θ and a diffraction angle 2θ for detection) required by a person who analyzes and evaluates the sample battery S, a pressurization condition for the sample battery S, and the like.

An O-ring 51 is arranged on the tip surface of the insulating member 21 as an airtight member for pressing the partition member 12 (current collector layer) against the back surface of the pressure receiving unit 10. In the cross-sectional views of FIGS. 2, 4, 6, 6A, 60, and 10, a hatching on the O-ring 51 is omitted.

As shown in FIG. 5, a flange portion 21a extending radially outwards from the base end edge is formed in the insulating member 21, and this flange portion 21a is fastened to one end surface side of the battery accommodation unit 20 by the fasteners 50 such as bolts. With the tightening force (pushing pressure) at this time, the partition member 12 (current collector layer) is pressed against the back surface of the pressure receiving unit 10 via the O-ring 51 (see FIG. 4). As a result, the partition member 12 (current collector layer) comes into close contact with the periphery of the X-ray window 11 to close the X-ray window 11.

All of the work of mounting the pressure receiving unit 10 on the other end surface side of the battery accommodation unit 20 by the fasteners 50 described above, the work of inserting the partition member 12 (current collector layer) into a hollow portion of the pressure receiving unit 10 to arrange the partition member 12 (current collector layer) on the back surface of the pressure receiving unit 10, and the work of fitting the insulating member 21 into the hollow portion of the pressure receiving unit 10 and fastening the flange portion 21a to the one end surface side of the pressure receiving unit 10 by the fasteners 50 are works which do not handle the main body of the sample battery S (excluding the current collector layer as the partition member 12), these works can be performed in the atmosphere. Therefore, the work of tightening the fasteners 50 such as a large number of bolts can be performed relatively easily without being burdensome.

As shown in FIGS. 3 to 5, the structure for battery analysis of the present embodiment includes a block holder 13. The block holder 13 is attached to the surface of the pressure receiving unit 10 by a fastener 50 such as a bolt. A convex portion 14 corresponding to the dimensional shape of the X-ray window 11 is formed in the block holder 13 (see FIG. 5), and the convex portion 14 is fitted in the X-ray window 11, and the tip surface thereof is arranged on the same plane as an opening portion on the back surface of the X-ray window 11, so that the convex portion 14 has a function of filling the opening portion on the back surface of the X-ray window 11 and eliminate a large dent.

Figure 6C:
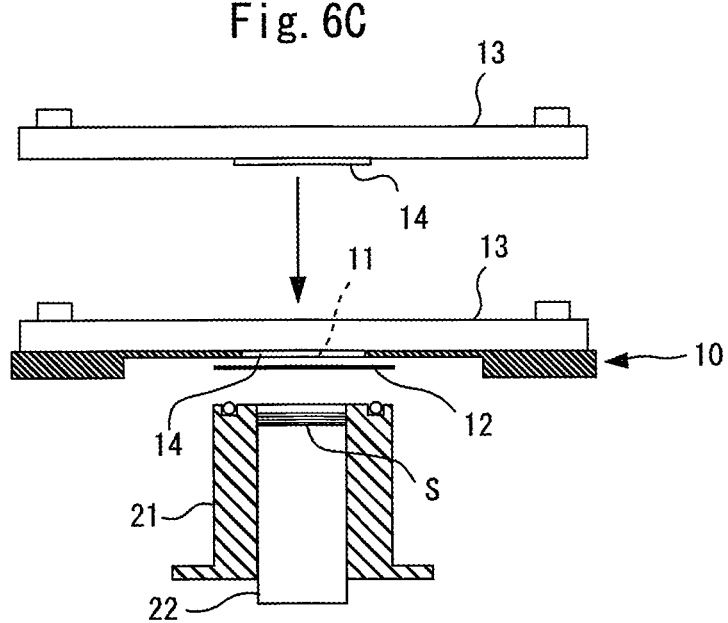
FIG. 6C is a front sectional view showing the function of a block holder.

As shown in FIG. 6C, the partition member 12 (current collector layer) is placed on the X-ray window 11 from the back surface side thereof, and the sample battery S is further pressed against the X-ray window 11 as described later. The pressure acting on the sample battery S may push the partition member 12 into the cutout hole of the X-ray window 11, which may cause a wrinkle or a crack to break the hermetically sealed state.

Therefore, the block holder 13 is mounted on the pressure receiving unit 10 in advance, so that the dent of the opening portion on the back surface of the X-ray window 11 is almost eliminated, and the partition member 12 (current collector layer) is supported by a substantially flat surface. As a result, it is possible to avoid the inconvenience of wrinkling or cracking in the partition member 12 (current collector layer).

Returning to FIGS. 2 to 4, the pressurizing unit 30 has a function of applying pressure to the sample battery S accommodated in the hollow portion of the battery accommodation unit 20 (specifically, in the hollow portion of the insulating member 21).

The pressurizing unit 30 has a cylindrical body portion. The body portion includes an outer body portion 30A and an inner body portion 30B, and the cylindrical inner body portion 30B is fitted into the cylindrical outer body portion 30A (into the hollow portion), and fixed and integrated by the fasteners 50 such as bolts (see FIG. 4).

Here, the outer body portion 30A is made of a synthetic resin material which has electrical insulating properties and has strength and airtightness which are capable of withstanding the reaction of pressurizing force (for example, polyvinyl chloride (PVC), polyvinylidene chloride (PVdC), polystyrene (PS), acrylonitrile-styrene copolymer (AS resin), acrylonitrile-butadiene-styrene copolymer (ABS resin), polyestyrene (HDPE), polypropylene (PP), polyacetal (POM), polymethylmethacrylate (PMMA), metalcle-styrene copolymer (MS), polycarbonate (PC), trifluoroethylene chloride (PCTFE), tetrafluoroethylene (PTFE) or the like). The inner body portion 30B is made of a metal material having strength capable of withstanding the reaction of the pressurizing force.

As shown in FIG. 4, the inner peripheral surface of the inner body portion 30B is formed in a stepped shape, and a nut portion 31 is formed on the inner peripheral surface of a rear portion having a smaller inner diameter. A single bolt member 32 is screwed into the nut portion 31. The bolt member 32 constitutes a pressurizing mechanism for applying pressure to the sample battery S accommodated in the hollow portion of the battery accommodation unit 20. Further, the bolt member 32 forms a conduction path for charging and discharging the sample battery S as described later. Therefore, the bolt member 32 is made of a metal material which has strength capable of applying a high pressure to the sample battery S and has electrical conductivity.

A pressure transmitting member 33 is freely slidably fitted onto the inner peripheral surface of a front portion having a larger inner diameter in the inner body portion 30B, and a load cell 34 as pressure measuring means is incorporated in the pressure transmitting member 33. The load cell 34 measures a pressure generated by screwing the bolt member 32, and outputs an electric signal indicating the measurement value to a pressure indicator (not shown) via an output rod 34a (output unit). By measuring the pressure in this way, it is possible to analyze and evaluate the correlation between the pressure acting on the sample battery S and the change in crystal structure caused by charging and discharging of the sample battery S.

The pressure transmitting member 33 and the load cell 34 also form a conduction path for charging and discharging the sample battery S as described later. Therefore, they are made of metal materials having electrical conductivity.

The pressure measuring means is not limited to the load cell, and for example, a torque wrench can be used instead of the load cell to determine the pressure from a torque acting on the bolt member 32.

As shown in FIG. 2, the pressurizing unit 30 is mounted on one end surface side (lower end surface side in FIG. 2) of the battery accommodating unit 20. A pressing member 22 formed in a columnar shape is inserted into the hollow portion of the battery accommodating unit 20 (specifically, into the hollow portion of the insulating member 21).

The pressing member 22 is interposed between the load cell 34 and the sample battery S, and has a function of pressing the sample battery S in a direction to the pressure receiving unit 10 with pressing force from the bolt member 32. In other words, following the screwing operation of the bolt member 32, the pressing force acts on the sample battery S via the pressure transmitting member 33, the load cell 34, and the pressing member 22, so that the sample battery S is pressed against the pressure receiving unit 10.

As a result, the sample battery S can be pressurized. The pressurization value can be arbitrarily set by adjusting the screwing amount of the bolt member 32 while referring to the display of the pressure indicator (not shown).

Here, the pressing member 22 also forms a conduction path for charging and discharging the sample battery S as described later. Therefore, it is made of a metal material having electrical conductivity.

As shown in FIGS. 2 to 4, the airtight case unit 40 is formed in a cylindrical shape, and one end surface side (upper end surface side in the figures) thereof is mounted on the other end surface side (lower end surface side in the figures) of the pressurizing unit 30. On the other hand, a flat plate-shaped base 44 is fixed on the other end surface side (lower end surface side in the figures) of the airtight case unit 40 by a fastener 50 such as a bolt. Therefore, by mounting it on the other end surface side of the pressurizing unit 30, the periphery of the other end surface side is hermetically sealed by the airtight case unit 40, and shielded from the atmosphere.

The head portion of the bolt member 32 provided in the pressurizing unit 30 is exposed on the other end surface side of the pressurizing unit 30, and arranged in the hollow portion of the airtight case unit 40. Since the inside of the hollow portion of the airtight case unit 40 is a hermetically sealed space, is possible to prevent infiltration of air into the battery accommodating unit 20 through a slight gap in a portion where the bolt member 32 and the nut portion 31 are threaded with each other.

The airtight case unit 40 is formed of a synthetic resin material having electrical insulating properties (for example, polyvinyl chloride (PVC), polyvinylidene chloride (PVdC), polystyrene (PS), acrylonitrile-styrene copolymer (AS resin), acrylonitrile-butadiene-styrene copolymer (ABS resin), polyestyrene (HDPE), polypropylene (PP), polyacetal (POM), polymethylmethacrylate (PMMA), metaclestyrene copolymer (MS), polycarbonate (PC), trifluoroethylene chloride (PCTFE), tetrafluoroethylene (PTFE) or the like).

A male screw portion 23 is provided on one end surface side (lower end surface side in the figures) of the battery accommodation unit 20 described above, and a female screw portion 35 is provided on one end surface side (upper end surface side in the figures) of the pressurizing unit 30 to be mounted on the one end surface side of the battery accommodation unit 20. The male screw portion 23 and the female screw portion 35 are threaded with each other and screwed together, whereby the one end surface side of the pressurizing unit 30 is mounted on the one end surface side of the battery accommodation unit 20.

Further, a second male screw portion 37 is provided on the other end surface side (lower end surface side in the figures) of the pressurizing unit 30 described above, and a second female screw portion 41 is provided on one end surface side (upper end surface side in the figures) of the airtight case unit 40 to be mounted on the other end surface side of the pressurizing unit 30. The second male screw portion 37 and the second female screw portion 41 are threaded with each other, and screwed together, whereby one end surface side of the airtight case unit 40 is mounted on the other end surface side of the pressurizing unit 30.

As described above, by carrying out a simple work of merely performing the screwing operation of a pair of male and female screw portions, it is possible to mount the pressurizing unit 30 on the battery accommodation unit 20 and hermetically seal between the battery accommodation unit 20 having the sample battery S accommodated therein and the pressurizing unit 30. Likewise, by carrying out a simple work of performing the screwing operation of a pair of male and female screw portions, it is possible to mount the airtight case unit 40 on the pressurizing unit 30 and hermetically seal the periphery of the other end surface side of the pressurizing unit 30 from which the bolt member (pressurization mechanism) is exposed.

Therefore, the worker can easily perform the assembling work from the outside of the glove box through the gloves.

No special tool is required for these screwing operations. For example, it is possible to fix one of units to be screwed together and screw the other unit easily and manually while gripping the other unit.

In the present embodiment, as shown in FIG. 3, an operating rod 52 for a screwing operation is provided on each of the outer peripheral surface of the battery accommodation unit 20 and the outer peripheral surface of the pressurizing unit 30 so as to protrude outward in the radial direction. The worker can more easily perform each of the above screwing operations simply by rotating the operating rod 52 by hand.

Since the male screw portion 23 is formed on the battery accommodation unit 20 formed of metal, the female screw portion 35 to be threaded with the male screw portion 23 is also formed on the inner peripheral surface of the metal ring 36 as shown in FIG. 3, and the metal ring 36 is attached to the outer body portion 30A of the pressurizing unit 30 formed of synthetic resin by the fastener 50 such as a bolt. As a result, the female screw portion 35 can be provided with the same level wear resistance and strength as the male screw portion 23.

Further, an O-ring 51 as a hermetically sealing member is provided on one end surface of the pressurizing unit 30 to be brought into close contact with the one end surface side of the battery accommodation unit 20. Further, an O-ring 51 as a hermetically sealing member is also provided on one end surface of the airtight case unit 40 to be brought into close contact with the other end surface side of the pressurizing unit 30. By interposing these O-rings 51, it is possible to easily hermetically seal between the each of the respective units only by manually performing the screwing operation.

Returning to FIG. 1, the structure for battery analysis of the present embodiment is provided with a first electrode terminal 15 and a second electrode terminal 42 at the outside thereof.

The first electrode terminal 15 is fixed to the outer surface of the pressure receiving unit 10 by a fastener 50 such as a bolt. The pressure receiving unit 10 is made of a metal material having electrical conductivity. Therefore, as shown in FIG. 2, the first electrode terminal is set to be electrically conducted to one of the electrode active material layers of the sample battery S via the pressure receiving unit 10 and the partition member 12 (current collector layer) having electrical conductivity.

The second electrode terminal 42 is fixed to the outer peripheral surface of the airtight case unit 40 by a fastener 50 such as a bolt. A conductive member 43 that is electrically conducted to the second electrode terminal 42 is arranged inside the airtight case unit 40. The conductive member 43 is formed of a metal plate having a spring property, and is positioned so that the head portion of the bolt member 32 comes into contact with the conductive member 43 when the airtight case unit 40 is mounted on the pressurizing unit 30.

Therefore, as shown in FIG. 2, the second electrode terminal 42 is electrically conducted to the other electrode active material layer of the sample battery S via the conduction path formed by the conductive member 43, the bolt member 32, the pressure transmitting member 33, the load cell 34, and the pressing member 22.

Therefore, the sample battery S accommodated in the battery accommodation unit 20 can be charged by causing current to flow between the first electrode terminal 15 and the second electrode terminal 42, and the sample battery S can be discharged by conducting these electrode terminals with a resistor interposed therebetween.

As shown in FIG. 2, the first electrode terminal 15 and the second electrode terminal 42 are insulated from each other by the outer body portion 30A made of synthetic resin in the pressuring unit 30 and the airtight case unit 40 made of synthetic resin.

Figure 7A:
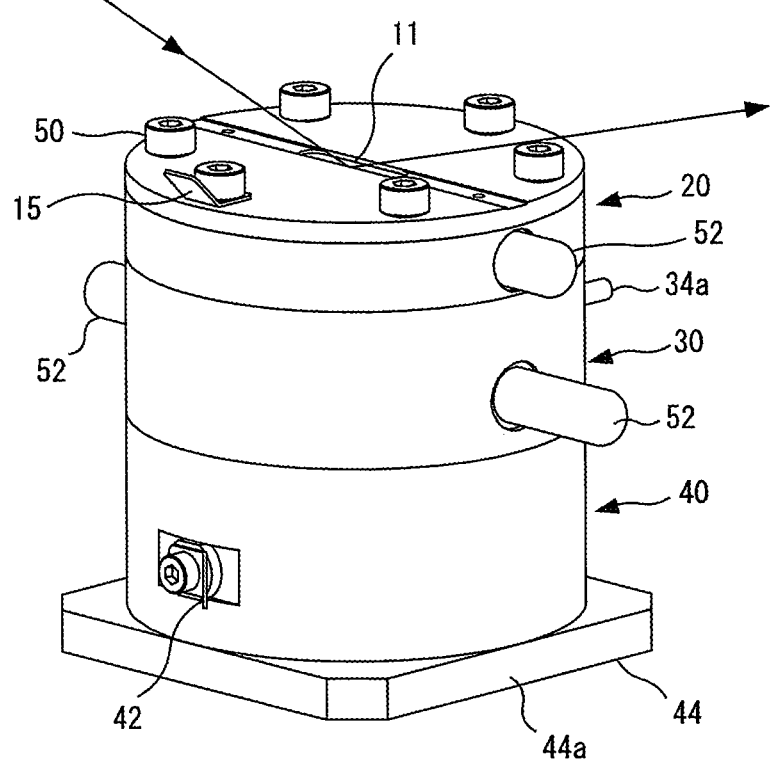
FIG. 7A is a perspective view showing the implementation of X-ray diffraction measurement using the structure for battery analysis according to the first embodiment of the present invention.

As shown in FIG. 7A, the structure for battery analysis according to the present embodiment having the above-described configuration enables X-ray diffraction measurement in the atmosphere while it is mounted on a sample stage of the X-ray diffraction device. Here, the base 44 is configured so that the longitudinal direction of the X-ray window 11 can be positioned to the incident direction of X-rays merely by mounting the base 44 while a preset reference end face 44a is mated with a reference face provided on the sample stage of the X-ray diffraction device.

Figure 7B:
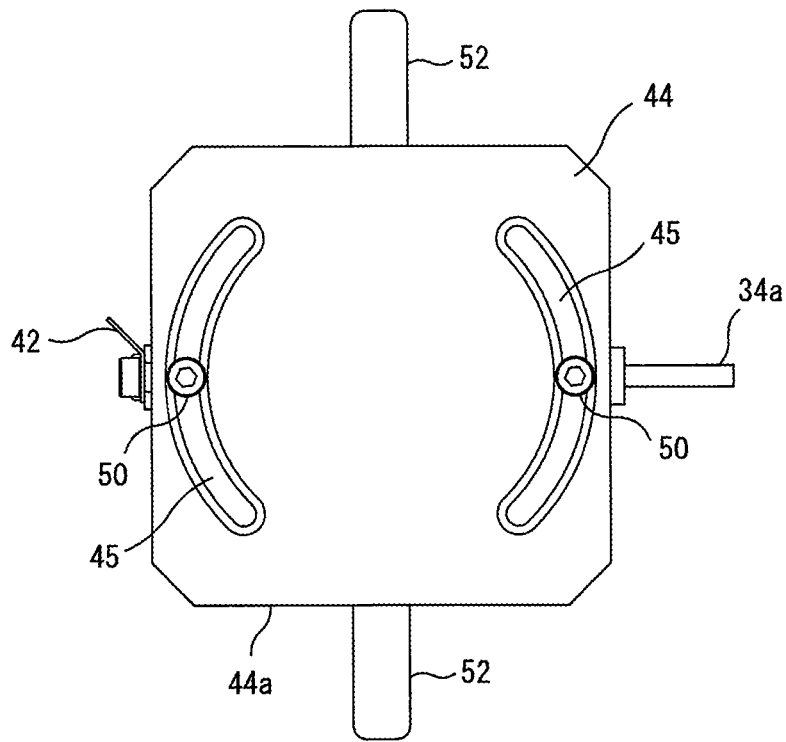
FIG. 7B is a bottom view showing an adjustment in orientation between a reference end face of a base and the X-ray window.

As shown in FIG. 7B, arcuate elongated holes 45 are formed in the base 44, and the base 44 is fixed to the airtight case unit 40 by fasteners 50 such as bolts through the elongated holes 45. By loosening the fasteners 50 and rotating the airtight case unit 40 along the elongated holes relatively to the base 44, the relative orientation between the reference end face 44a of the base 44 and the X-ray window 11 can be adjusted in advance.

Figure 8:
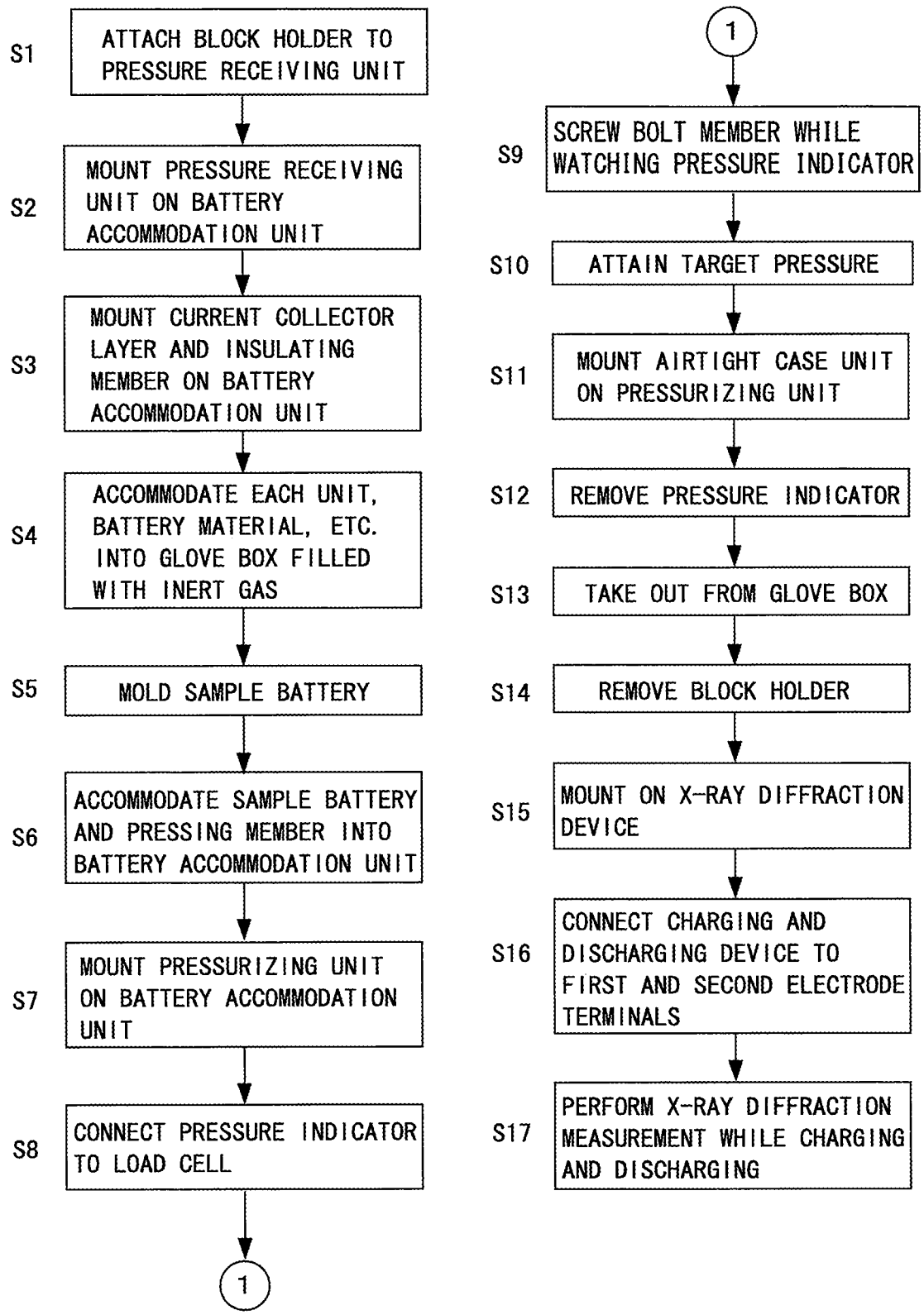
FIG. 8 is a flowchart showing an analysis and evaluation method of a sample battery using the structure for battery analysis according to the first embodiment of the present invention.

Next, a method for analyzing and evaluating a sample battery using the structure for battery analysis according to the present embodiment will be described with reference to FIG. 8.

First, the block holder 13 is attached to the pressure receiving unit 10 (step S1), and then the pressure receiving unit 10 is mounted on the battery accommodation unit 20 (step S2). Thereafter, the partition member 12 (current collector layer) serving as the partition member is placed on the back surface of the pressure receiving unit 10, and the insulating member 21 is mounted on the battery accommodation unit 20 (step S3). As a result, the partition member 12 (current collector layer) is pressed against the back surface of the pressure receiving unit 10, and the X-ray window 11 is hermetically sealed.

The work up to this point can be performed outside the glove box.

Next, the necessary component units, the battery materials, the pressure indicator, etc. are accommodated inside the glove box filled with an inert gas (for example, argon gas) (step S4).

The worker fits his/her hands to the gloves equipped in the glove box, and first molds the sample battery S in the glove box (step S5). Next, the molded sample battery S is accommodated into the battery accommodation unit 20, and the pressing member 22 is inserted into the battery accommodation unit 20 (step S6).

Next, the pressurizing unit 30 is mounted on the battery accommodation unit 20 (step S7), and the pressure indicator is further connected to the load cell 34 (step S8).

After the work up to this point is terminated, the bolt member 32 is screwed in while watching the pressure indicator, thereby applying pressure to the sample battery S in the battery accommodation unit 20 (step S9). The screwing operation of the bolt member 32 is performed by using a tool such as a spanner. When the pressure acting on the sample battery S reaches a target value, the screwing operation of the bolt member 32 is terminated (step S10).

Next, the airtight case unit 40 is mounted on the pressurizing unit 30 (step S11), and the pressure indicator is removed from the load cell 34 (step S12). When the airtight case unit 40 has been mounted, the assembling work of the structure for battery analysis is completed.

Thereafter, the structure for battery analysis is taken out from the glove box (step S13), and the block holder 13 is removed from the pressure receiving unit 10 (step S14).

Next, the structure for battery analysis is mounted on the X-ray diffraction device (step S15), and a charging and discharging device is connected to the first and second electrode terminals 15 and 42 (step S16). X-ray diffraction measurement is performed on the sample battery S while charging and discharging the sample battery S (step S17), and the characteristics of the sample battery S are analyzed and evaluated based on the measurement data. Here, the pressure indicator may be connected to the output rod 34a during or after the X-ray diffraction measurement to measure the pressure acting on the sample battery S. As a result, a measurement result obtained by the X-ray diffraction measurement can be analyzed and evaluated while making a connection with the pressure of the sample battery S.

Note that X-ray diffraction measurement can be performed on the sample battery S after charging and discharging the sample battery S.

Figure 9:
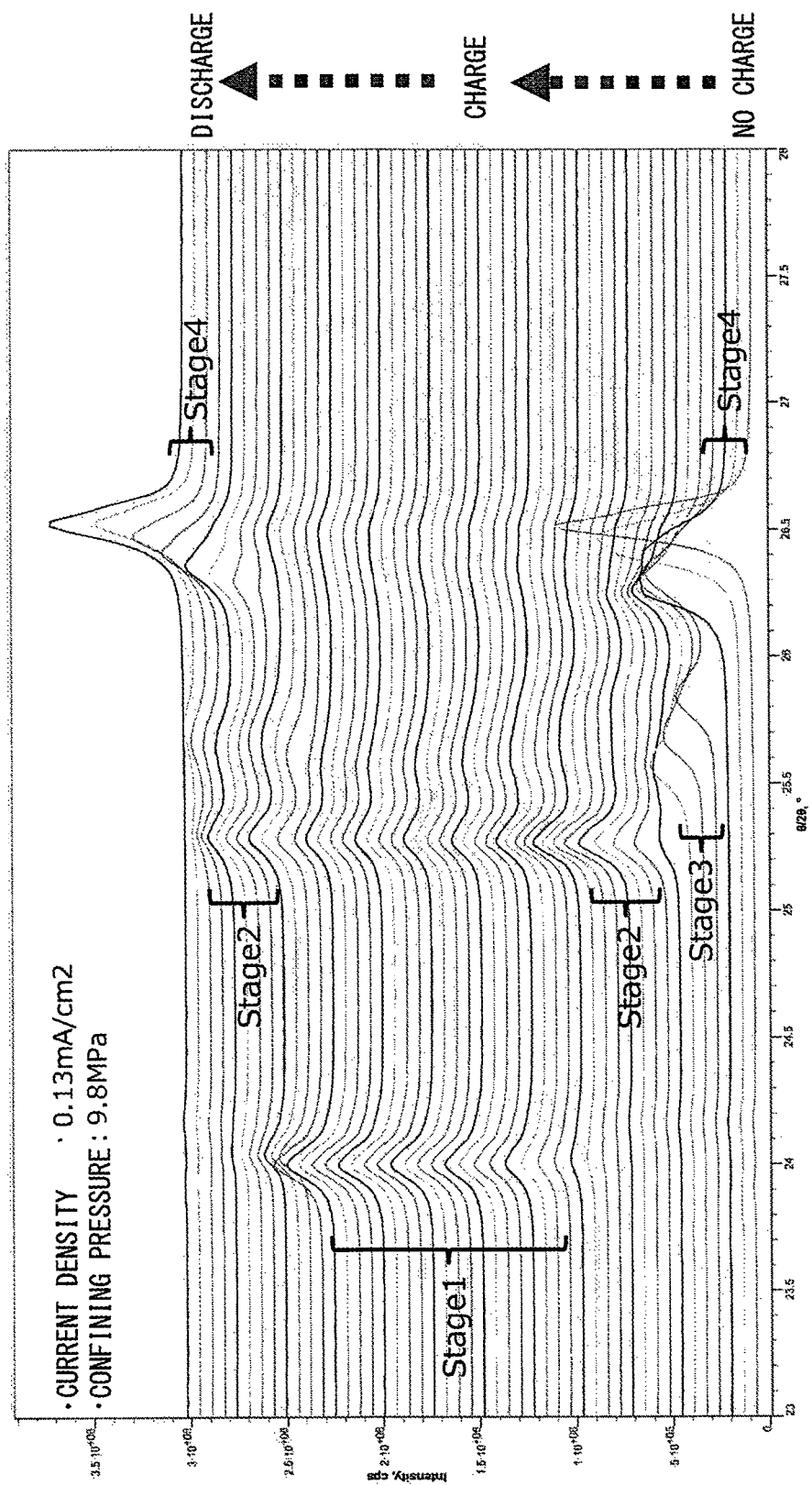
FIG. 9 is a graph showing a result obtained by observing a state change (a stage state change caused by insertion/removal of lithium ions) in a charging/discharging process of a negative electrode active material for an all-solid-state battery using the structure for battery analysis according to the first embodiment of the present invention by an X-ray diffraction device.

FIG. 9 is a graph showing a result obtained by observing, by the X-ray diffraction device, a state change (a stage state change caused by insertion/removal of lithium ions) in a charging and discharging process of a negative electrode active material for an all-solid-state battery using the structure for battery analysis according to the present embodiment. A pressure of 9.8 MPa is applied to the sample battery.

As shown in FIG. 9, the state change of each stage can be clearly observed from the change of the peak value of the diffracted X-rays in connection with charging and discharging.

Second Embodiment

Next, a structure for battery analysis according to a second embodiment of the present invention will be described in detail with reference to FIGS. 10 to 17.

In the structure for battery analysis according to the second embodiment of the present invention, the same components as or components corresponding to those of the structure for battery analysis according to the first embodiment of the present invention shown in FIGS. 1 to 8 are represented by the same reference signs, and detailed description thereof may be omitted.

Figure 10:
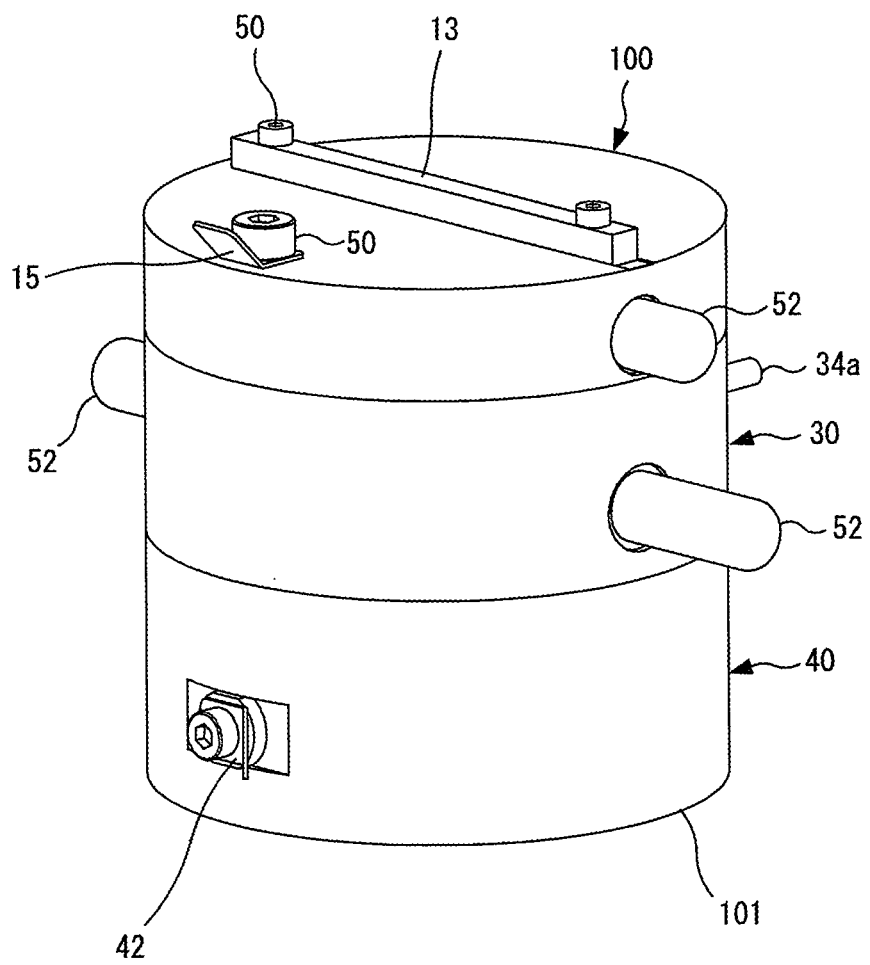
FIG. 10 is a perspective view showing the appearance of a structure for battery analysis according to a second embodiment of the present invention.
Figure 11:
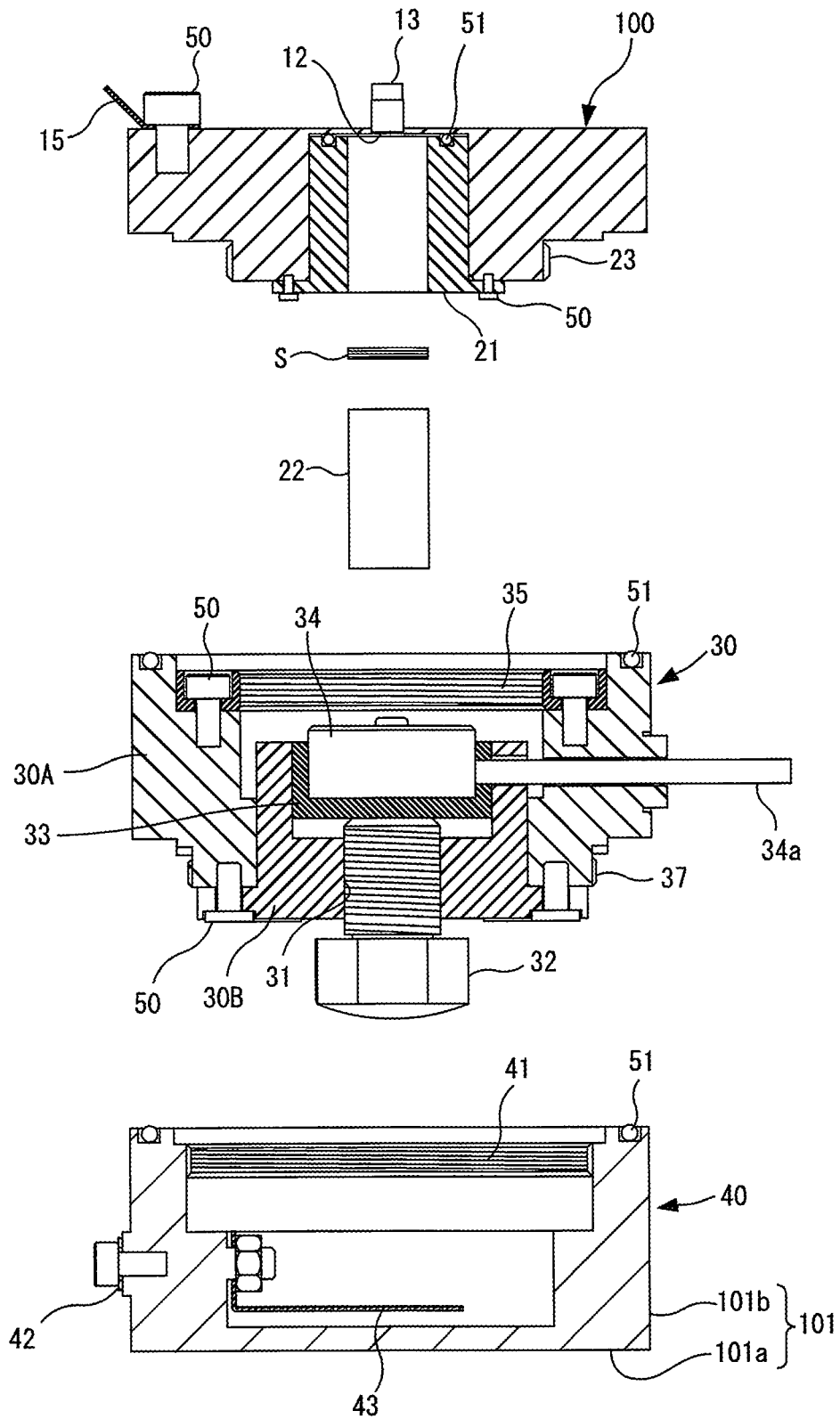
FIG. 11 is an exploded front sectional view showing the structure for battery analysis according to the second embodiment of the present invention.

FIG. 10 is a perspective view showing the appearance of the structure for battery analysis according to the present embodiment, and FIG. 11 is an exploded front sectional view of the structure for battery analysis. FIG. 10 corresponds to FIG. 1, and FIG. 11 corresponds to FIG. 4.

In the first embodiment described above, for example, as shown in FIGS. 1 and 4, the pressure receiving unit 10 and the battery accommodation unit 20 are respectively configured as separate units, and the pressure receiving unit 10 is crimped and fixed to the battery accommodation unit 20 by using the fasteners 50.

On the other hand, in the present embodiment, the pressure receiving unit 10 and the battery accommodation unit 20 are formed integrally with each other, and are configured as a single pressure receiving and battery accommodating unit 100.

In other words, the pressure receiving and battery accommodating unit 100 is a unit including the pressing receiving unit 10 and the battery accommodation unit 20 in the first embodiment, and has the functions of the respective units 10 and 20 as they are.

The descriptions on the pressure receiving unit 10 and the battery accommodation unit 20 in the first embodiment are also applied to the pressure receiving and battery accommodating unit 100 except for the content related to the mounting of the pressure receiving unit 10 on the battery accommodation unit 20 using the fasteners 50.

Further, in the present embodiment, in the first embodiment described above, the flat plate type base 44 mounted on the lower end surface side of the airtight case unit 40 is omitted, and the lower portion of the airtight case unit 40 is configured as a base portion 101 for mounting on an X-ray diffraction device described later. The base portion 101 includes a circular bottom surface 101*a* in the airtight case unit 40, and a circumferential surface 101*b* (only a lower region) rising from the bottom surface 101*a* (see FIG. 11).

Figure 12:
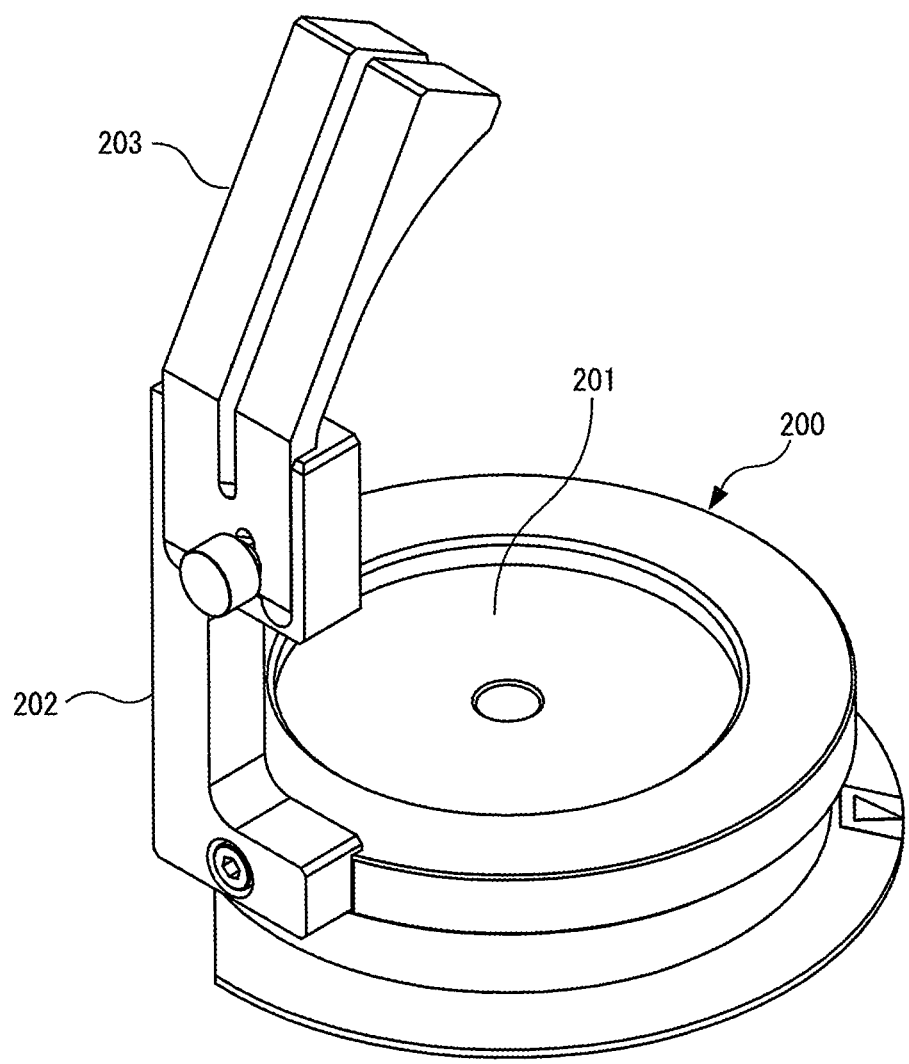
FIG. 12 is a perspective view showing a mounting stage for mounting the structure for battery analysis according to the second embodiment of the present invention on the X-ray diffraction device.

The X-ray diffraction device on which the structure for battery analysis according to the present embodiment is mounted includes a mounting stage 200 as shown in FIG. 12. The structure for battery analysis is freely rotatably mounted on the mounting stage 200.

Figure 13:
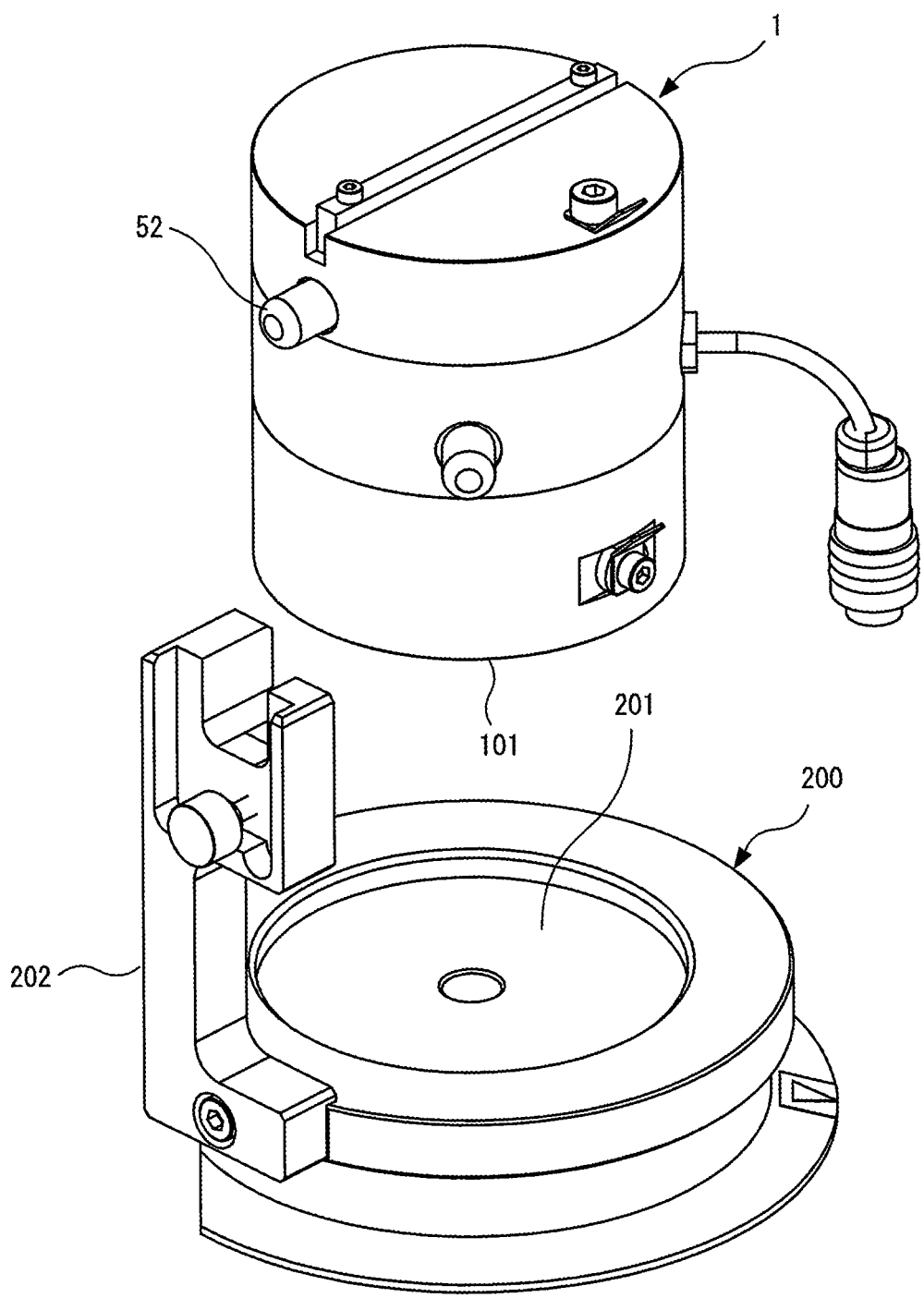
FIG. 13 is a perspective view showing an operation of mounting the structure for battery analysis on the mounting stage.
Figure 14:
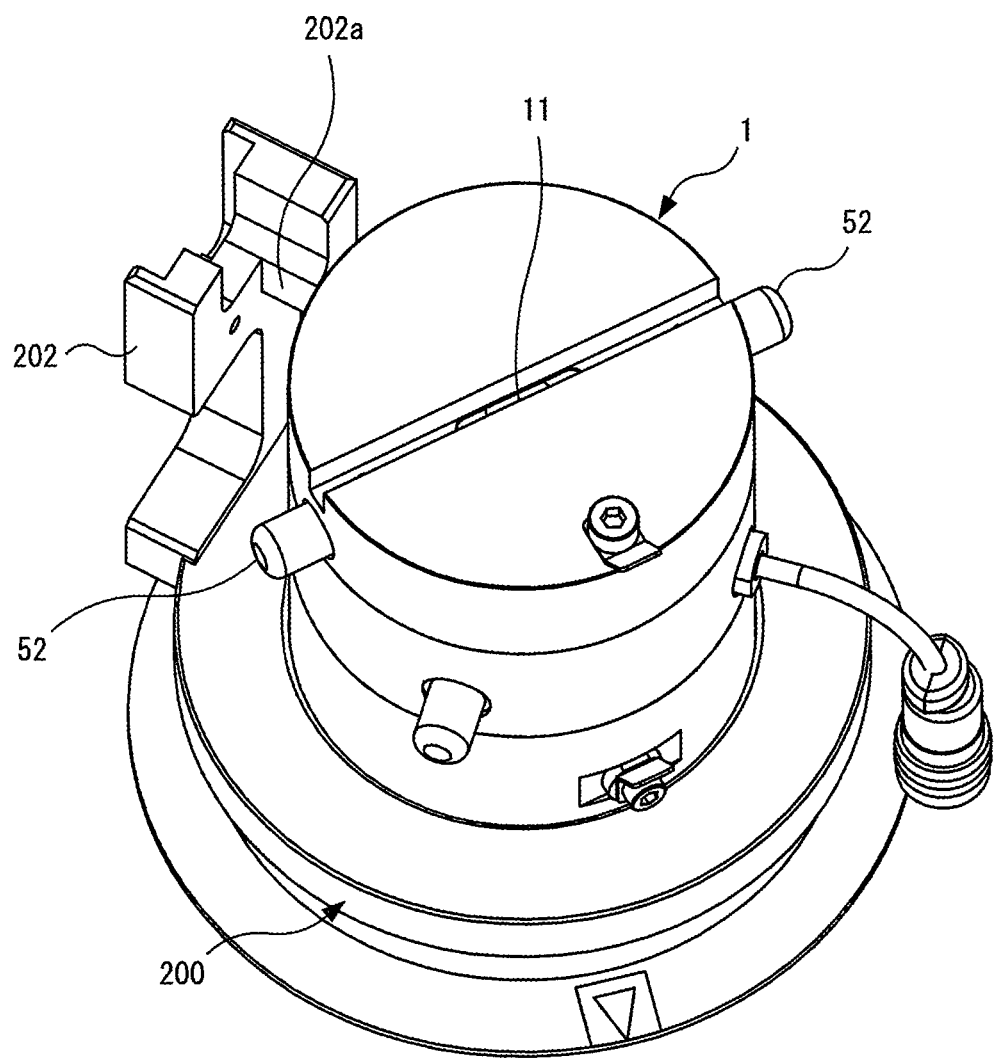
FIG. 14 is a perspective view showing a state in which the structure for battery analysis is arranged in a circumferential groove of the mounting stage.

A circumferential groove 201 on which the structure for battery analysis is placed is formed in the mounting stage 200. As shown in FIGS. 13 to 14, the base portion 101 of the airtight case unit 40 in the structure for battery analysis 1 is mounted in the circumferential groove 201, whereby the structure for battery analysis 1 is mounted on the mounting stage 200 while supported by the bottom surface of the circumferential groove 201. Further, the structure for battery analysis 1 can be freely rotated while guided by the inner peripheral surface of the circumferential groove 201.

Further, the mounting stage 200 is provided with a positioning block 202 which stands upright on the outside of the circumferential groove 201, and a positioning portion 202*a* is formed on a part of the inner surface of the positioning block 202 (see FIG. 14).

Further, the structure for battery analysis 1 is provided with operating rods 52 that protrude outward radially from the outer peripheral surface of the pressure receiving and battery accommodating unit 100 (the battery accommodation unit 20 in the first embodiment), and the operating rods 52 also function as positioning contact portions. In other words, as shown in FIG. 14, the structure for battery analysis 1 mounted on the mounting stage 200 is rotated to bring the positioning contact portion 52 into contact with the positioning portion 202*a* as shown in FIG. 15, whereby the X-ray window 11 of the structure for battery analysis 1 can be positioned with respect to X-rays a irradiated from the X-ray diffraction device.

Here, the positional relation between the positioning portion 202*a* and the positioning contact portions 52 and the positional relation between the positioning contact portions 52 and the X-ray window 11 are adjusted in advance so that the central trajectory of the X-rays a irradiated from the X-ray source of the X-ray diffraction device and the longitudinal direction in which the elongated X-ray window 11 opens are located on the same vertical plane, and the X-rays a are incident from the X-ray window 11 and irradiated to the sample battery S placed inside in a state where the positioning contact portion 52 is brought into contact with the positioning portion 202*a*.

Figure 15:
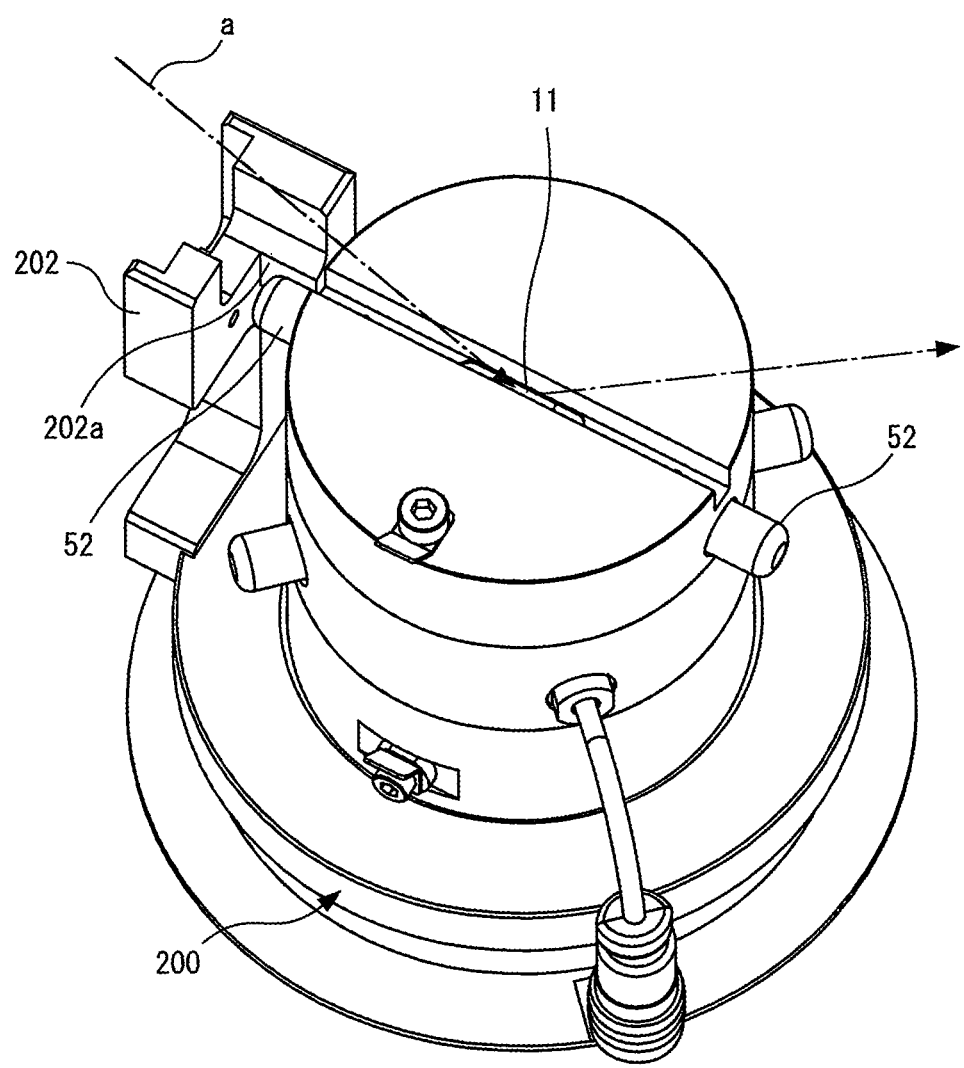
FIG. 15 is a perspective view showing a positioning structure provided between the mounting stage and the structure for battery analysis.

Further, the positioning contact portions 52 are provided so as to protrude outward from two places which are symmetrical with respect to the rotation center when the structure for battery analysis 1 is rotated on the mounting stage 200, and any one of the positioning contact portions 52 is selected and brought into contact with the positioning portion 202*a*, whereby X-rays a can be made incident from a direction which is different by 180 degrees with respect to the X-ray window 11 (see FIG. 15).

Figure 16:
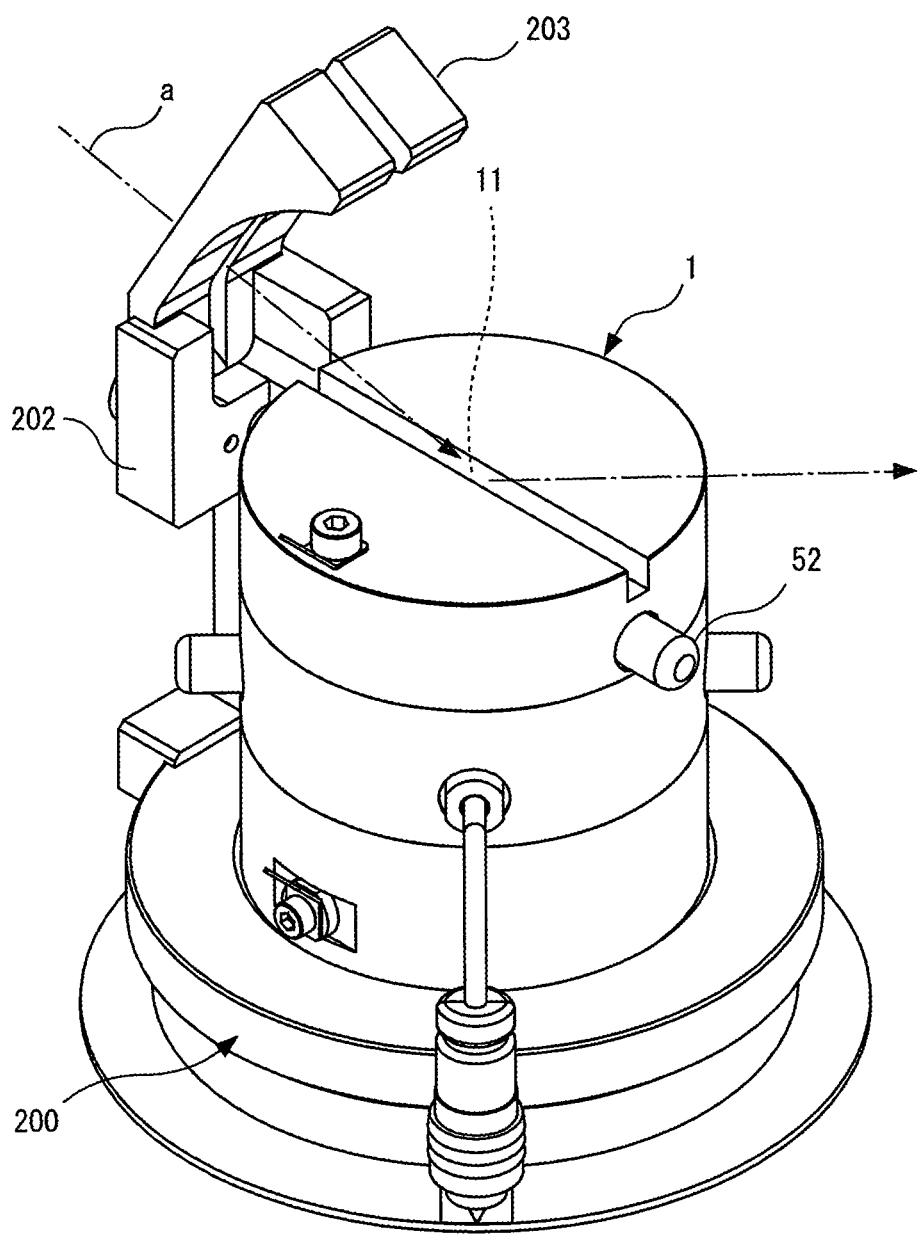
FIG. 16 is a perspective view showing a slit provided on the mounting stage.

Further, as shown in FIG. 16, the positioning block 202 provided to the mounting stage 200 is configured so that a slit 203 is freely detachably mounted on the positioning block 202. For example, a slit called a Schultz slit can be applied as the slit 203, which can limit the width in the lateral direction of the X-rays a irradiated from the X-ray source to the X-ray window 11. Therefore, since scattered radiation generated by irradiation of X-rays to portions other than the sample battery S can be reduced, so that highly accurate X-ray diffraction measurement can be implemented.

Figure 17:
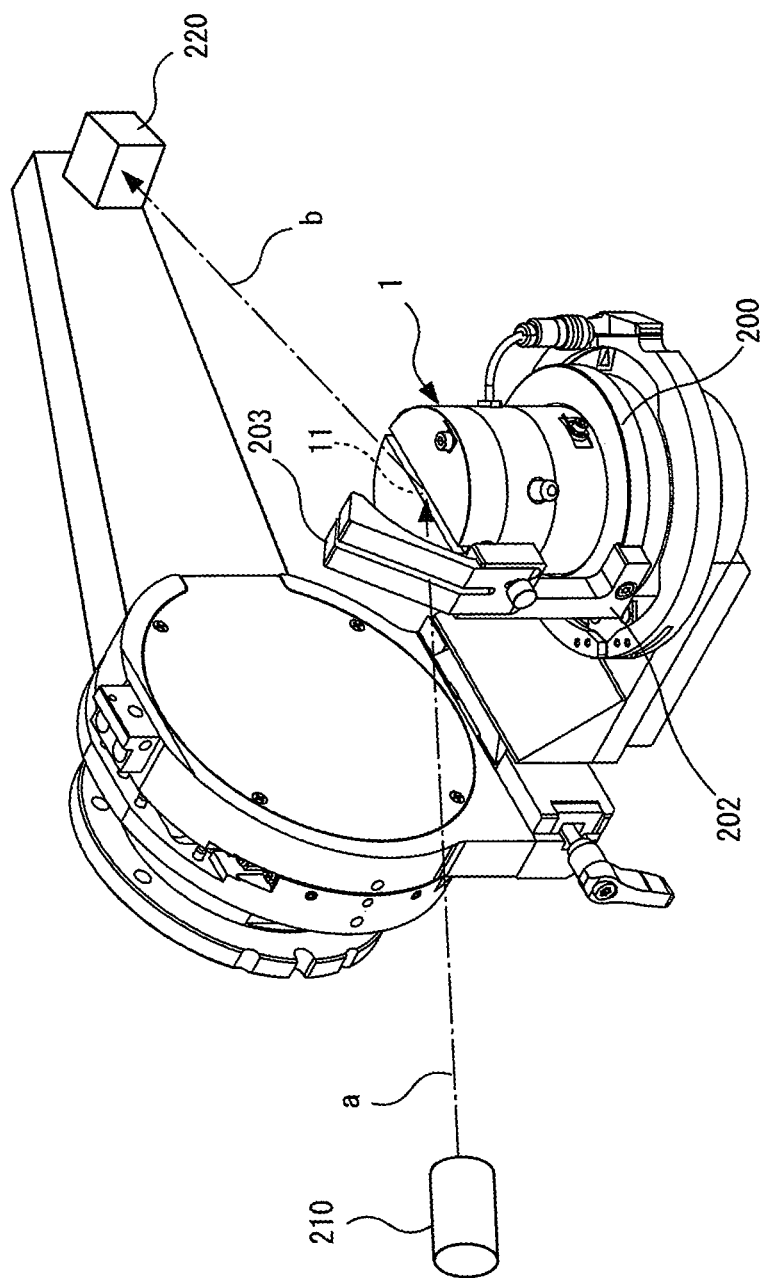
FIG. 17 is a perspective view showing the appearance of the X-ray diffraction device on which the structure for battery analysis is mounted.

FIG. 17 is a perspective view showing the appearance of the X-ray diffraction device on which the structure for battery analysis is mounted.

As shown in FIG. 17, the structure for battery analysis is mounted on the mounting stage 200 of the X-ray diffraction device. The X-rays a emitted from the X-ray source 210 is incident to the X-ray window 11 through the slit 203. Then, the X-ray detector 220 detects diffracted X-rays b reflected from the sample battery S accommodated in the structure for battery analysis 1, whereby X-ray diffraction measurement on the sample battery S can be executed.

[Modification or Application]

It should be noted that the present invention is not limited to the above-described embodiments, and it goes without saying that various modifications and applications can be implemented.

For example, the structure for battery analysis of the present invention can be applied for analysis and evaluation on sample batteries as analysis targets which are not limited to all-solid-state batteries, but may be various other batteries such as a lithium ion battery and the like.

Further, the glove box is not indispensable for assembling the structure for battery analysis according to the present invention, and an assembling work using no glove box is possible depending on the type of the sample battery.

The configurations of the respective members such as the pressure receiving unit, the battery accommodation unit, the pressurizing unit, the airtight case unit, and the insulating member are not limited to the configurations in the above-described embodiments. For example, which part of each component is made of a conductive or insulating material can be appropriately changed in design depending on the installation location of each electrode terminal and the like.

Further, as shown in FIG. 18, a recess portion 61 may be provided around the back surface of the X-ray window 11 formed in the pressure receiving unit 10, and a thin plate-like window filling material 60 which is formed of vitrified carbon (glassy carbon) or beryllium may be arranged in the recess portion 61. The window filling material 60 is joined to the back surface of the pressure receiving unit 10 with an adhesive or by brazing.

The back surface of the window filling material 60 is arranged on the same plane as a surface 10*a* on which the partition member 12 is arranged on the back surface of the pressure receiving unit 10.

Glassy carbon and beryllium have the property of transmitting X-rays therethrough and blocking the atmosphere. Moreover, since they have high resistance to pressure, they would not be pushed into the cutout hole of the X-ray window 11 even if they suffer the pressure acting on the sample battery S, so that the partition member 12 (current collector layer) and the sample battery S can be supported by a flat surface.

The structure of the base portion 101 in the airtight case unit 40 illustrated in the second embodiment, the structure of the mounting stage 200 of the X-ray diffraction device (see FIG. 12), the positioning structure for the X-ray window 11 by the positioning portion 202*a* and the positioning contact portion (operating portion 52) (see FIG. 15), the installation structure of the slit 203, and the like can also be applied to the structure for battery analysis according to the first embodiment.

The invention claimed is:

1. A structure for battery analysis comprising:
a battery accommodation unit in which a hollow portion for accommodating a sample battery therein is formed;
a pressurizing unit that is mounted on one end surface side of the battery accommodation unit and includes a pressurizing mechanism for applying pressure to the sample battery accommodated in the hollow portion of the battery accommodation unit; and
a pressure receiving unit that is fixed to the other end surface side of the battery accommodation unit and receives pressure acting on the sample battery, wherein the pressure receiving unit includes an X-ray window for irradiating the sample battery accommodated in the hollow portion of the battery accommodation unit with X-rays and emitting diffracted X-rays reflected from the sample battery to an outside, the X-ray window being formed by a cutout hole penetrating from a front surface to a back surface, and a partition member for transmitting X-rays therethrough and shielding the hollow portion in the battery accommodation unit from an atmosphere is arranged in the X-ray window;
wherein the sample battery is configured so that electrode active material layers are arranged on both end sides of an electrolyte layer and current collector layers are further arranged outside the electrode active material layers respectively, and a first electrode terminal that is electrically conducted to one of the current collector layers, and a second electrode terminal that is electrically conducted to the other current collector layer are provided outside.

2. The structure for battery analysis according to claim 1, wherein the pressure receiving unit and the battery accommodation unit are formed integrally with each other.

3. The structure for battery analysis according to claim 1, wherein the X-ray window is configured to have a smaller width than a press region where the sample battery accommodated in the hollow portion of the battery accommodation unit is in contact with the partition member.

4. The structure for battery analysis according to claim 1, wherein the pressurizing mechanism includes a bolt member for adjusting pressure to act on at least the sample battery, a nut portion to be threaded with the bolt member is formed in the pressurizing unit, and a pressing member is inserted into the hollow portion of the battery accommodation unit, and the sample battery receives pressure from the bolt member via the pressing member.

5. The structure for battery analysis according to claim 4, wherein the pressurizing unit includes an output unit for outputting an electric signal related to a pressure acting on the pressing member.

6. The structure for battery analysis according to claim 1, wherein the first electrode terminal is provided outside the pressure receiving unit, the pressure receiving unit is formed of a metal member having electrical conductivity, and the one current collector layer and the first electrode terminal are electrically conducted to each other via the pressure receiving unit.

7. The structure for battery analysis according to claim 1, wherein the pressurizing mechanism is configured by a metal member having electrical conductivity, and the other current collector layer and the second electrode terminal are electrically conducted to each other via the pressurizing mechanism.

8. The structure for battery analysis according to claim 1, wherein the partition member is configured as one of the current collector layers constituting the sample battery, and the pressurizing mechanism is configured to press the sample battery and the partition member against a back surface of the pressure receiving unit so that the partition member and one of the electrode active material layers constituting the sample battery are in close contact with each other.

9. The structure for battery analysis according to claim 1, further comprising a block holder that is fitted from an opening portion of a front surface of the X-ray window and is arranged so that a tip surface thereof fills an opening portion of a back surface of the X-ray window.

10. The structure for battery analysis according to claim 1, wherein a recess portion is provided around a back surface of the X-ray window formed in the pressure receiving unit, and glassy carbon or beryllium of a thin plate-like shape is placed in the recess portion.

11. The structure for battery analysis according to claim 1 to be freely rotatably mounted on an X-ray diffraction device, further comprising a positioning contact portion that comes into contact with a positioning portion provided in the X-ray diffraction device to position the X-ray window with respect to X-rays emitted from the X-ray diffraction device.

12. The structure for battery analysis according to claim 11, wherein the positioning contact portion is provided at each of two places which are symmetrical with respect to a rotation center when the structure for battery analysis is rotated so as to be freely rotatably with respect to the X-ray diffraction device.

13. The structure for battery analysis according to claim 1 to be freely rotatably mounted on an X-ray diffraction device, further comprising a base portion having a circular bottom surface and a circumferential surface that is arranged on a mounting stage including a circular groove provided in the X-ray diffraction device and is freely rotatable while guided by the circular groove of the mounting stage.

14. An X-ray diffraction device on which the structure for battery analysis according to claim 1 is mounted, wherein the X-ray diffraction device is configured so as to irradiate the sample battery accommodated in the hollow portion of the battery accommodation unit with X-rays through the X-ray window to perform X-ray diffraction measurement.

15. The X-ray diffraction device according to claim 14, further comprising:
a positioning block including a positioning portion for positioning the X-ray window of the structure for battery analysis; and
a slit which is freely attachable and detachable to the positioning block, and reduces scatter X-rays generated from other portions than the sample battery accommodated in the hollow portion of the battery accommodation unit.

16. A structure for battery analysis comprising:
a battery accommodation unit in which a hollow portion for accommodating a sample battery therein is formed;
a pressurizing unit that is mounted on one end surface side of the battery accommodation unit and includes a pressurizing mechanism for applying pressure to the sample battery accommodated in the hollow portion of the battery accommodation unit; and
a pressure receiving unit that is fixed to the other end surface side of the battery accommodation unit and receives pressure acting on the sample battery, wherein the pressure receiving unit includes an X-ray window for irradiating the sample battery accommodated in the hollow portion of the battery accommodation unit with X-rays and emitting diffracted X-rays reflected from the sample battery to an outside, the X-ray window being formed by a cutout hole penetrating from a front surface to a back surface, and a partition member for transmitting X-rays therethrough and shielding the hollow portion in the battery accommodation unit from an atmosphere is arranged in the X-ray window;
wherein the structure for battery analysis further comprises an insulating member which is fitted in the hollow portion of the battery accommodation unit to insulate an outer peripheral surface of the sample battery accommodated in the hollow portion and close the X-ray window, wherein a tip surface of the insulating member is pressed against the partition member via an airtight member, whereby the partition member comes into close contact with a periphery of the X-ray window with pressing force to close the X-ray window.

17. The structure for battery analysis according to claim 16, wherein male and female screw portions are provided between one end surface side of the battery accommodation unit and one end surface side of the pressurizing unit to be mounted on the one end surface side of the battery accommodation unit, and the one end surface side of the pressurizing unit is mounted on the one end surface side of the battery accommodation unit by a screwing operation of the screw portions to hermetically seal the units.

18. The structure for battery analysis according to claim 17, wherein the pressurizing mechanism is exposed to the other end surface side of the pressurizing unit on which no screw portion is provided, an airtight case unit for airtightly sealing a periphery of the pressurizing mechanism exposed to the other end surface side of the pressurizing unit is provided, second male and female portions are provided between the other end surface side of the pressurizing unit and one end surface side of the airtight case unit to be mounted on the other end surface side of the pressurizing unit, and the one end surface side of the airtight case unit is mounted on the other end surface side of the pressurizing unit by a screwing operation of the second screw portions to airtightly seal the periphery of the pressurizing mechanism.

* * * * *